(12) United States Patent
Ragot et al.

(10) Patent No.: US 11,419,347 B2
(45) Date of Patent: Aug. 23, 2022

(54) COMPOSITION FOR MAKING A TEA BEVERAGE OR HERBAL AND VEGETABLE BROTHS

(71) Applicant: Schweitzer-Mauduit International, Inc., Alpharetta, GA (US)

(72) Inventors: Philippe Ragot, Le Mans (FR); Bernard Mompon, Vannes (FR); Cedric Rousseau, Le Mans (FR); Esther Pons, Pessac (FR); Christian Pineau, Saint Germain en Laye (FR)

(73) Assignee: Schweitzer-Mauduit International, Inc., Alpharetta, GA (US)

( * ) Notice: Subject to any disclaimer, the term of this patent is extended or adjusted under 35 U.S.C. 154(b) by 472 days.

(21) Appl. No.: 14/193,910

(22) Filed: Feb. 28, 2014

(65) Prior Publication Data

US 2014/0295049 A1 Oct. 2, 2014

Related U.S. Application Data

(60) Provisional application No. 61/770,564, filed on Feb. 28, 2013.

(51) Int. Cl.
| | |
|---|---|
| *A23F 3/18* | (2006.01) |
| *A23L 2/08* | (2006.01) |
| *A23F 3/34* | (2006.01) |
| *A23F 3/30* | (2006.01) |
| *B65D 85/812* | (2006.01) |
| *B65D 85/816* | (2006.01) |
| *B65D 85/808* | (2006.01) |
| *A23F 3/36* | (2006.01) |
| *A23F 3/22* | (2006.01) |
| *A23L 27/10* | (2016.01) |
| *A23L 23/10* | (2016.01) |

(52) U.S. Cl.
CPC ............... *A23F 3/18* (2013.01); *A23F 3/225* (2013.01); *A23F 3/30* (2013.01); *A23F 3/34* (2013.01); *A23F 3/363* (2013.01); *A23L 2/08* (2013.01); *A23L 23/10* (2016.08); *A23L 27/10* (2016.08); *B65D 85/808* (2013.01); *B65D 85/812* (2013.01); *B65D 85/816* (2013.01)

(58) Field of Classification Search
None
See application file for complete search history.

(56) References Cited

U.S. PATENT DOCUMENTS

| | | | |
|---|---|---|---|
| 3,353,541 A | 11/1967 | Hind et al. | |
| 3,386,449 A | 6/1968 | Hind | |
| 3,415,253 A | 12/1968 | Michels et al. | |
| 3,420,241 A | 1/1969 | Hind et al. | |
| 3,428,053 A | 2/1969 | Schoenbaum et al. | |
| 3,467,109 A | 9/1969 | Block et al. | |
| 3,483,874 A | 12/1969 | Hind | |
| 3,561,451 A | 2/1971 | Jacin et al. | |
| 3,760,815 A | 9/1973 | Deszyck | |
| 3,847,164 A | 11/1974 | Mattina et al. | |
| 3,860,012 A | 1/1975 | Selke | |
| 4,182,349 A | 1/1980 | Selke | |
| 4,674,519 A | 6/1987 | Keritsis et al. | |
| 4,891,232 A | 1/1990 | Dahl | |
| 5,529,796 A * | 6/1996 | Gobbo | A23F 3/18 426/330.3 |
| 5,715,844 A | 2/1998 | Young et al. | |
| 5,724,998 A | 3/1998 | Gellatly et al. | |
| 5,765,570 A | 6/1998 | Litzinger et al. | |
| 6,761,918 B2 | 7/2004 | Pulikkottil et al. | |
| 6,818,234 B1 | 11/2004 | Nair et al. | |
| 7,001,629 B1 | 2/2006 | Menqal et al. | |
| 7,595,428 B2 * | 9/2009 | Ueda | A61L 15/40 604/359 |
| 7,793,585 B2 | 9/2010 | Ramussen | |
| 8,499,965 B2 | 8/2013 | Sheffield | |
| 8,597,667 B2 | 12/2013 | Mou et al. | |
| 8,734,881 B2 | 5/2014 | Yoakim et al. | |
| 9,220,296 B2 | 12/2015 | Fall et al. | |
| 2002/0132098 A1 | 9/2002 | Miyazawa et al. | |
| 2003/0004479 A1* | 1/2003 | Ueda | A61L 15/40 604/359 |
| 2003/0113411 A1* | 6/2003 | Rose | B65D 85/808 426/77 |
| 2003/0187055 A1 | 10/2003 | Riker | |
| 2004/0156920 A1* | 8/2004 | Kane | A01N 65/00 424/725 |
| 2004/0180077 A1 | 9/2004 | Riker | |

(Continued)

FOREIGN PATENT DOCUMENTS

| | | | |
|---|---|---|---|
| CN | 1329855 A | 1/2002 | |
| CN | 1565286 A | 1/2005 | |
| CN | 1957777 A | 5/2007 | |
| CN | 102919430 | 2/2012 | |
| CN | 102422941 B * | 12/2012 | ............... A23F 3/34 |

(Continued)

OTHER PUBLICATIONS

Raventos et al., Application and Possibilities of Supercritical $CO_2$ Extraction in Food Processing Industry: An Overview, Food Science Tech. Int. (2002), vol. 8 (5) pp. 269-284.

(Continued)

*Primary Examiner* — Tamra L. Dicus
(74) *Attorney, Agent, or Firm* — Dority & Manning, P.A.

(57) ABSTRACT

The present invention relates to an infusion product for making a beverage, more specifically to a plant-based composition for making a beverage, and to a herbal and/or vegetable composition or bouquet garni. The plants are fruits, herbs, medicinal plants, tea, vegetables and/or spices. The invention further relates to a method for producing said compositions or infusion product, its use for making a (tea) beverage, and a (tea) beverage so obtained. Further, the present invention relates to a fiber-web, preferably a tea bag, made from said fruits, herbs, medicinal plants, tea, vegetable and/or spices.

19 Claims, 16 Drawing Sheets

(56) References Cited

U.S. PATENT DOCUMENTS

| | | |
|---|---|---|
| 2005/0064049 A1 | 3/2005 | Mori et al. |
| 2005/0088632 A1 | 4/2005 | Sadi |
| 2005/0158252 A1 | 7/2005 | Romanowski |
| 2006/0165756 A1 | 7/2006 | Catani |
| 2007/0199453 A1 | 8/2007 | Ramussen |
| 2009/0047328 A1 | 2/2009 | Cunningham |
| 2009/0169654 A1* | 7/2009 | Banerjee ............... A23F 3/405 424/729 |
| 2010/0032444 A1 | 2/2010 | Sheffield |
| 2010/0196545 A1* | 8/2010 | Buffet ............... B65D 85/8043 426/79 |
| 2010/0210866 A1 | 8/2010 | Toyohara et al. |
| 2010/0233322 A1* | 9/2010 | Fukuda ................ A23F 3/14 426/77 |
| 2011/0020512 A1* | 1/2011 | Masutake ........... A23C 9/1524 426/329 |
| 2011/0236502 A1 | 9/2011 | Guillory |
| 2013/0280320 A1 | 10/2013 | Mompon |
| 2014/0224265 A1 | 8/2014 | Rouillard et al. |
| 2015/0037389 A1 | 2/2015 | Ragot et al. |
| 2015/0050371 A1 | 2/2015 | Gehling et al. |
| 2015/0056255 A1 | 2/2015 | Ragot et al. |
| 2015/0175810 A1 | 6/2015 | Rieland |
| 2015/0374624 A1 | 12/2015 | Ragot et al. |
| 2016/0255854 A1 | 9/2016 | Rousseau |

FOREIGN PATENT DOCUMENTS

| | | | |
|---|---|---|---|
| CN | 103054156 | | 4/2013 |
| DE | 202010001912 U1 | | 3/2011 |
| JP | 09163930 A | * | 6/1997 |
| JP | H10304822 | | 11/1998 |
| JP | 2001131866 A | | 5/2001 |
| JP | 2005119967 | | 5/2005 |
| JP | 2005306742 A | | 11/2005 |
| JP | 2006050934 A | | 2/2006 |
| JP | 2006246817 A | | 9/2006 |
| JP | 2006249599 A | | 9/2006 |
| JP | 2006256968 A | | 9/2006 |
| JP | 2007098152 | | 4/2007 |
| JP | 2011182783 A | | 9/2011 |
| KR | 10-2007-0090286 | * | 9/2007 |
| KR | 20100114348 | | 10/2010 |
| WO | WO0205655 | | 1/2002 |
| WO | WO03091500 | | 11/2003 |

OTHER PUBLICATIONS

Greer, C.C,. A Text-Book of Cooking; J.S. Cushing Co.—Berwick & Smith Co. Norwood, MA 1915, pp. 175-177.
Innovation Food Online, Sodium Alginate; URL<https://innovatoninfood.wikispaces.com/Sodium+alginate> Published Jan. 4, 2007 Online, 7 pages with one extra page having google search hit with datestamp.
CN20090097787; Huimin, Y., dated Apr. 2009, English Abstract Only, 2 pages.
SU1161061; Choladze, et al., dated Jun. 1985,English Abstract Only, 2 pages.
Blumenthal et al., Herbal Medicine, Expanded Commission E. Monographs, 2000, pp. 393-400.
Co-pending U.S. Appl. No. 15/053,134, dated Feb. 25, 2016.
Co-Pending, U.S. Appl. No. 15/506,620, filed Feb. 24, 2017.
Blumenthal and al., Herbal Medicine, Expanded Commission E. Monographs, pp. 393-400.
Adams et al., Analysis of the Interactions of Botanical Extract Combinations Against the Viability of Prostate Cancer Cell Lines, Mar. 2003, pp. 117-124.
Lin et al., Inhibition of Helicobacter Pylori and Associated Urease by Oregano and Cranberry Phytochemical Synergies, Applied and Environmental Microbiology, Dec. 2005, vol. 71., No. 12, pp. 8558-8564.
International Search Report and Written Opinion for Application No. PCT/US2014/018870 dated Jun. 10, 2014.

* cited by examiner

COMPOSITION FOR MAKING A TEA BEVERAGE OR HERBAL AND VEGETABLE BROTHS

RELATED APPLICATIONS

The present application is based upon and claims priority to U.S. Provisional Patent Application Ser. No. 61/770,564 filed on Feb. 28, 2013, which is incorporated herein by reference.

FIELD OF THE INVENTION

The present invention relates to an infusion product for making a beverage, more specifically to a plant-based composition for making a beverage, and to a herbal and/or vegetable composition or bouquet garni, for food, medicinal or aromatic applications. The plants (raw materials) are fruits, herbs, medicinal plants, tea, vegetables and/or spices. The invention further relates to a method for producing said compositions or infusion product, its use for making a (tea) beverage, and a (tea) beverage so obtained. Further, the present invention relates to a fiber-web, preferably a tea bag, made from said fruits, herbs, medicinal plants, tea, vegetable and/or spices.

BACKGROUND OF THE INVENTION

A quick cup of tea, either from herbs, medicinal plants or tea plants (*Camellia sinensis*), also called "infusion" or "tisane" may be produced by putting conventional tea bags filled with parts of said fruits, herbs, medicinal plants, or tea (such as, for example, in the form of leaves or powder) in a cup of hot or boiling water. For some teas, such as fruit teas or teas made from herbs or medicinal plants, the steep time is rather long, whereas for various kinds of tea plants, maintaining a certain steep time is required for producing the best flavour. In some cases, there is either an incomplete extraction from the bag, resulting in a highly variable and generally weak flavored beverage, or an excessive extraction, resulting in a highly variable and generally strong or even bitter taste. The flavour and taste also greatly depends on water quality and temperature.

Similarly, herbs and spices are used for cooking, for example in a loose form or as a bouquet garni, or in the form of powders or bouillon cubes. However, broth made from rehydrated cubes is different in taste from fresh broth because of its higher salt content and flavours changed by the boiling process. Bouillon cubes are convenient and inexpensive but have little nutritive value.

There is still a need to improve infusion products for making a tea beverage, in particular to allow for fast infusion that is more independent from external factors and temperature and suitable to provide a more standardized beverage or herb-infused broth while avoiding variable infusion results.

SUMMARY OF THE INVENTION

In one embodiment of the present invention, a composition for making a beverage is provided, the composition comprising a layer of fibrous plant product and a plant extract applied thereto. In another embodiment of the present invention, a herbal and/or vegetable composition or bouquet garni is provided, also referred to as herbal infusion or herb-infused broth products, wherein the herbal and/or vegetable composition comprises a layer of fibrous plant product and a plant extract applied thereto.

In the products of the invention, the plant is for example selected from the group consisting of fruits, herbs, medicinal plants, tea, vegetables and spices, including mixtures thereof, such as, for example, mixtures of herbs, vegetables and/or spices.

A further embodiment of the invention relates to a method for producing the composition of the present invention. For example, the method comprises the steps of:

a) extracting components of at least one plant with a solvent;
b) separating the soluble portion (plant extract) from the non-soluble portion (solid plant particles);
c) optionally refining the non-soluble portion;
d) preparing a sheet-like product from the non-soluble portion;
e) optionally concentrating the soluble portion;
f) applying the soluble portion of step b) or concentrated soluble portion of step e) to the sheet of step d); and
g) drying the product of step f) to obtain the composition of the invention.

In a further embodiment, the invention relates to a fiber-web comprising from about 5% to about 100% (w/w), preferably at least 10%, at least 20%, at least 30%, at least 40%, at least 50%, at least 60%, at least 70%, at least 80%, at least 90%, or 100%, fibers of fruits, herbs, medicinal plants, tea, vegetables and/or spices. In one embodiment, the fiber-web further comprises (i) fibers of fruits, herbs, medicinal plants, tea, vegetables and/or spices, and (ii) cellulosic and/or synthetic fibers in a ratio of for example: 40/60 (w/w), 60/40 (w/w) or 20/80 (w/w). In another embodiment of the invention, the fiber-web of the present invention is obtainable by the method disclosed herein, namely as an intermediate product in step d) of the said method.

According to a further embodiment, the fiber-web of the invention further comprises a coating or an impregnation with the soluble portion (plant extract) of said fruits, herbs, medicinal plants, or tea. In another embodiment of the invention, the fiber-web of the present invention is obtainable by the method disclosed herein, namely as the end product in step g) of said method.

In a further embodiment, the invention relates to a tea bag comprising the fiber-web referred to herein, which is either impregnated with the soluble portion (plant extract) of said fruits, herbs, medicinal plants, or tea, or which is not impregnated. The tea bag may be empty or filled, i.e. the tea bag may further comprise inside a sample or portion of fruits, herbs, medicinal plants, or tea.

DETAILED DESCRIPTION OF THE INVENTION

Figure 1:
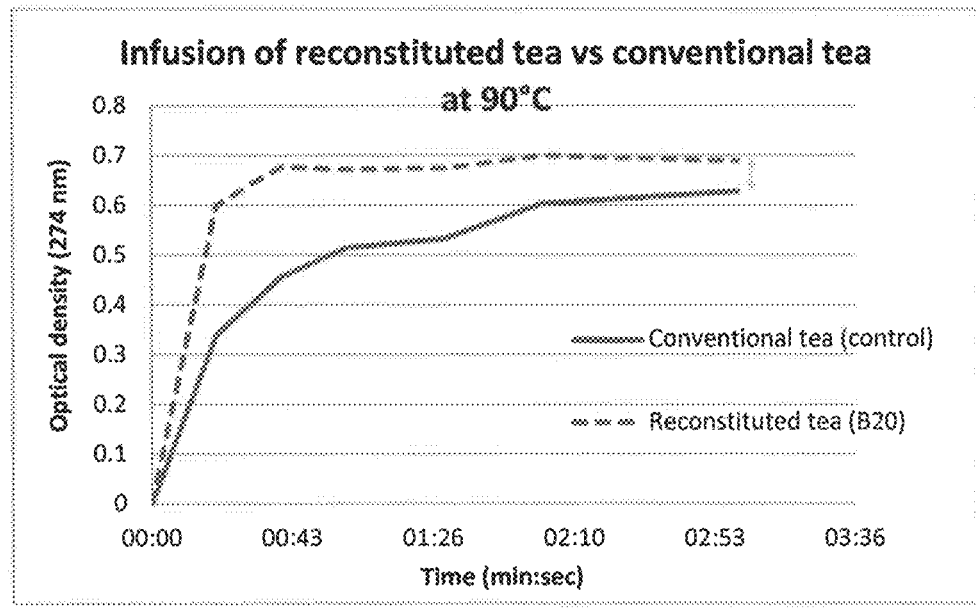
FIG. 1 is a graph showing total infusion time in hot water (90° C.) for an impregnated tea product (fiber-web made of non soluble tea particles impregnated with soluble tea portion) as compared to a conventional tea in the form of a tea bag.

In one embodiment of the present invention, a composition for making a beverage (such as a drink or tea) is provided, the composition comprising a layer of fibrous plant product and a plant extract applied thereto. In another embodiment of the present invention, a herbal, vegetable and/or spice composition or bouquet garni is provided, the composition comprising a layer of fibrous plant product and a plant extract applied thereto. The composition is a plant-based composition or product which is also referred to as plant composition or infusion product, respectively. Hereinafter, the aforementioned compositions are often referred to as "composition(s) or product(s) of the invention", "composition(s)" or "products". The herbal, vegetable and/or spice composition or bouquet garni is also referred to as "mixture of herbs and spices", "herbal infusion" or "herb-infused broth product". These terms are used interchangeably and are not intended to limit the invention.

As used herein, the term "plant" likewise refers to any living organism of the kingdom Plantae and includes plants described as grains, fruits and vegetables as well as plant parts, such as roots, barks, seeds, stems, leaves, flowers and fruits.

In the products of the invention, the plant is for example selected from the group consisting of fruits, herbs, medicinal plants, tea, vegetables and/or spices, including mixtures thereof, such as mixtures of herbs and vegetables, or herbs and spices.

As used herein, a spice is a dried seed, fruit, root, bark, or vegetative substance primarily used for flavoring, coloring or preserving food. As used herein, herbs are any plants used for flavoring, food, medicine, or perfume. Culinary use typically distinguishes herbs as referring to the leafy green parts of a plant (either fresh or dried), from a "spice", a product from another part of the plant (usually dried), including seeds, berries, bark, roots and fruits.

In connection with the present invention, the term "plant however, any plant part may be utilizes, such as roots, bark, seeds, stems, leaves, flowers and fruit.

The fruits, herbs, medicinal plants, tea, vegetables and spices are for example selected from artemisia, balm, basil, chamomile, chive, cloves, coffee, coriander, dill, garlic, ginger, *ginseng, gingko*, jasmine, lavender, mint, orange blossom, oregano, persil, rooibos, *rosa centifolia*, rosemary, thyme, turmeric, sage, pepper, chili pepper, *stevia rebaudiana*, tarragon, white tea, yellow tea, green tea, oolong tea, black tea, pu-erh tea, *vanilla*, red or green vine, violet and/or willow.

In some embodiments of the invention, the plant is for example selected from the group consisting of culinary herbs and spices such as:

Ajwain, carom seeds (*Trachyspermum ammi*), Akudjura (*Solanum centrale*), Alexanders (*Smyrnium olusatrum*), Alkanet (*Alkanna tinctoria*), Alligator pepper, mbongo spice (mbongochobi), hepper pepper (*Aframomum danielli, A. citratum, A. exscapum*), Allspice (*Pimenta dioica*), *Angelica* (*Angelica archangelica*), Anise (*Pimpinella anisum*), Aniseed myrtle (*Syzygium anisatum*), Annatto (*Bixa orellana*), Apple mint (*Mentha suaveolens*), Asafoetida (*Ferula assa-foetida*), Asarabacca (*Asarum europaeum*), Avens (*Geum urbanum*), Avocado leaf (*Peresea americana*), Barberry (*Berberis vulgaris* and other *Berberis* spp.), Basil, sweet (*Ocimum basilicum*), Basil, lemon (*Ocimum×citriodorum*), Basil, Thai (*O. basilicum* var. *thyrsiflora*), Basil, Holy (*Ocimum tenuiflorum*), Bay leaf (*Laurus nobilis*), Bay leaf Indian, tejpat, malabathrum, Boldo (*Peumus boldus*), Borage (*Borago oficinalis*), Black cardamom (*Amomum subulatum, Amomum costatum*), Black mustard (*Brassica nigra*), Blue fenugreek, blue melilot (*Trigonella caerulea*), Brown mustard (*Brassica juncea*), Caraway (*Carum carvi*), Cardamom (*Elettaria cardamomum*), Carob (*Ceratonia siliqua*), Catnip (*Nepeta cataria*), Cassia (*Cinnamomum aromaticum*), Cayenne pepper (*Capsicum annuum*), Celery leaf (*Apium graveolens*), Celery seed (*Apium graveolens*), Chervil (*Anthriscus cerefolium*), Chicory (*Cichorium intybus*), Chili pepper (*Capsicum* spp.), Chives (*Allium schoenoprasum*), Cicely, sweet cicely (*Myrrhis odorata*), Cilantro, coriander greens, coriander herb (*Coriandrum sativum*), Cinnamon, Indonesian (*Cinnamomum burmannii, Cassia vera*), Cinnamon, Saigon or Vietnamese (*Cinnamomum loureiroi*), Cinnamon, true or Ceylon (*Cinnamomum verum, C. zeylanicum*), Cinnamon, white (*Canella winterana*), Cinnamon myrtle (*Backhousia myrtifolia*), Clary, Clary sage (*Salvia sclarea*), Clove (*Syzygium aromaticum*), Coriander seed (*Coriandrum sativum*), Costmary (*Tanacetum balsamita*), Cuban oregano (*Plectranthus amboinicus*), Cubeb pepper (*Piper cubeba*), Cudweed (*Gnaphalium* spp.), Culantro, culangot, long coriander (*Eryngium foetidum*), Cumin (*Cuminum cyminum*), Curry leaf (*Murraya koenigii*), Curry plant (*Helichrysum italicum*), Dill seed (*Anethum graveolens*), Dill herb or weed (*Anethum graveolens*), Elderflower (*Sambucus* spp.), Epazote (*Dysphania ambrosioides*), Fennel (*Foeniculum vulgare*), Fenugreek (*Trigonella foenum-graecum*), Filé powder, gumbo filé (*Sassafras albidum*), Fingerroot, krachai, temu kuntji (*Boesenbergia rotunda*), Galangal, greater (*Alpinia galanga*), Galangal, lesser (*Alpinia officinarum*), Galingale (*Cyperus* spp.), Garlic chives (*Allium tuberosum*), Garlic (*Allium sativum*), Garlic, elephant (*Allium ampeloprasum* var. *ampeloprasum*), Ginger (*Zingiber officinale*), Ginger, torch, bunga siantan (*Etlingera elatior*) (Indonesia), Golpar, Persian hogweed (*Heracleum persicum*) (Iran), Grains of paradise (*Aframomum meleguela*), Grains of Selim, Kani pepper (*Xylopia aethiopica*), Horseradish (*Armoracia rusticana*), *Houttuynia cordata* (Vietnam), Huacatay, Mexican marigold, mint marigold (*Tagetes minuta*), Hyssop (*Hyssopus officinalis*), Indonesian bay leaf, daun salam (*Syzygium polyanthum*), Jasmine flowers (*Jasminum* spp.), Jimbu (*Allium hypsistum*) (Nepal), Juniper berry (*Juniperus communis*), Kaffir lime leaves, Makrud lime leaves (*Citrus hystrix*) (Southeast Asia), Kala zeera (or kala jira), black cumin (*Bunium persicum*) (South Asia), Kawakawa seeds (*Macropiper excelsum*) (New Zealand), Kencur, galangal, kentjur (*Kaempferia galanga*), Keluak, kluwak, kepayang (*Pangium edule*), Kinh gioi, Vietnamese balm (*Elsholtzia ciliata*), Kokam seed (*Garcinia indica*) (Indian confectionery), Korarima, Ethiopian cardamom, false cardamom (*Aframomum corrorima*) (Eritrea), Koseret leaves (*Lippia adoensis*) (Ethiopia), Lavender (*Lavandula* spp.), Lemon balm (*Melissa officinalis*), Lemongrass (*Cymbopogon citratus, C. flexuosus*, and other *Cymbopogon* spp.), Lemon ironbark (*Eucalyptus staigeriana*) (Australia), Lemon myrtle (*Backhousia citriodora*) (Australia), Lemon verbena (*Lippia citriodora*), Leptotes bicolor (Paraguay and southern Brazil), Lesser calamint (*Calamintha nepeta*), nipitella, nepitella (Italy), Licorice, liquorice (*Glycyrrhiza glabra*), Lime flower, linden flower (*Tilia* spp.), Lovage (*Levisticum officinale*), Mace (*Myristica fragrans*), Mahlab, St. Lucie cherry (*Prunus mahaleb*), Marjoram (*Origanum majorana*), Marsh mallow (*Althaea officinalis*), Mastic (*Pislacia lentiscus*), Mint (*Mentha* spp.) 25 species, hundreds of varieties, Mountain horopito (*Pseudowintera colorata*) 'Pepperplant' (New Zealand), Musk mallow, abelmosk (*Abelmoschus moschatus*), Mustard, black, mustard plant, mustard seed (*Brassica nigra*), Mustard, brown, mustard plant, mustard seed (*Brassica juncea*), Mustard, white, mustard plant, mustard seed (*Sinapis alba*), Nasturtium (*Tropaeolum majus*), Nigella, kalonji, black caraway, black onion seed (*Nigella sativa*), Njangsa, djansang (*Ricinodendron heudelotii*) (West Africa), Nutmeg (*Myristica fragrans*), Neem, Olida (*Eucalyptus olida*) (Australia), Oregano (*Origanum vulgare, O. heracleoticum*, and other species), Orris root (*Iris germanica, I. florentina, I. pallida*), Pandan flower, kewra (*Pandanus odoratissimus*), Pandan leaf, screwpine (*Pandanus amaryllifolius*, Paprika (*Capsicum annuum*), Paracress (*Spilanthes acmella*, Soleracea) (Brazil), Parsley (*Petroselinum crispum*), Pepper: black, white, and green (*Piper nigrum*), Pepper, Dorrigo (*Tasmannia stipitata*) (Australia), Pepper, long (*Piper longum*), Pepper, mountain, Cornish pepper leaf (*Tasmannia lanceolata*), Peppermint (*Mentha piperata*), Peppermint gum leaf (*Eucalyptus dives*), Perilla, shiso (*Perilla* spp.), Peruvian pepper (*Schinus molle*), *Pandanus amaryllifolius*, Brazilian pepper or Pink pepper (*Schinus terebinthifolius*), Quassia (*Quassia amara*) (bitter spice in aperitifs and some beers and fortified wines), Ramsons, wood garlic (*Allium ursinum*), Rice paddy herb (*Limnophila aromatica*) (Vietnam), Rosemary (*Rosmarinus officinalis*), Rue (*Ruta graveolens*), Safflower (*Carthamus tinctorius*), for yellow color, Saffron (*Crocus sativus*), Sage (*Salvia officinalis*), Saigon cinnamon (*Cinnamomum loureiroi*), Salad burnet (*Sanguisorba minor*), Salep (*Orchis mascula*), Sassafras (*Sassafras albidum*), Savory, summer (*Satureja hortensis*), Savory, winter (*Satureja montana*), Silphium, silphion, laser, laserpicium, lasarpicium (Ancient Roman cuisine, Ancient Greek cuisine), Shiso (*Perilla frutescens*), Sorrel (*Rumex acetosa*), Sorrel, sheep (*Rumex acetosella*), Spearmint (*Mentha spicata*), Spikenard (*Nardostachys grandiflora* or *N. jalamansi*), Star anise (*Illicium verum*), Sumac (*Rhus coriaria*), Sweet woodruff (*Galium odoratum*), Szechuan pepper, Sichuan pepper (*Zanthoxylum piperitum*), Tarragon (*Artemisia dracunculus*), Thyme (*Thymus vulgaris*), Thyme, lemon (*Thymus*×*citriodorus*), Turmeric (*Curcuma longa*), Vanilla (*Vanilla planifolia*), Vietnamese cinnamon (*Cinnamomum loureiroi*), Vietnamese coriander (*Persicaria odorata*), Voatsiperifery (*Piper borbonense*), Wasabi (*Wasabia japonica*), Waterpepper, smartweed (*Polygonum hydropiper*), Watercress (*Rorippa nasturtium-aquatica*), Wattleseed (from about 120 spp. of Australian *Acacia*), White mustard (*Sinapis alba*), Wild betel (*Piper sarmentosum*) (Southeast Asia), Wild thyme (*Thymus serpyllum*), Willow herb (*Epilobium parviflorum*), Winter savory (*Satureja montana*), Wintergreen (*Gaultheria procumbens*), Wood avens, herb bennet (*Geum urbanum*), Woodruff (*Galium odoratum*), Wormwood, absinthe (*Artemisia absinthium*), Yellow mustard (*Brassica hirta*=*Sinapis alba*), Yerba buena, any of four different species, many unrelated, Za'atar (herbs from the genera *Origanum, Calamintha, Thymus*, and/or *Satureja*), Zedoary (*Curcuma zedoaria*).

In some embodiments of the invention, the plant is selected from the group consisting of teas and herbal teas such as:

Anise tea (seeds or leaves), Asiatic penny-wort leaf, Artichoke tea, Bee Balm, Boldo, Burdock, Caraway tea, Catnip tea, Chamomile tea, Che Dang tea (*Ilex causue* leaves), Chinese knot-weed tea, Chrysanthemum tea, Cinnamon, Coca tea, Coffee tea leaves and coffee cherry tea, Cerasse, Citrus peel (including bergamot, lemon and orange peel), Dandelion coffee, Dill tea, Echinacea tea, Elderberry, European Mistletoe (*Viscum album*), Essiac tea, Fennel, Gentian, Ginger root, Ginseng, Goji, Hawthorn, *Hibiscus*, Ho Yan Hor Herbal Tea, Honeybush, Horehound, Houttuynia, *Hydrangea* tea (*Hydrangea serrata* Amacha), Jiaogulan, Kapor tea, Kava root, Kratom, Kuzuyu, Labrador tea, Lapacho (also known as Taheebo), Lemon Balm, Lemon and ginger tea, Lemon grass, Luo han guo, Licorice root, Lime blossom, Mint, Mountain Tea, Neem leaf, Nettle leaf, New Jersey Tea, Noni tea, Oksusu cha, Pennyroyal leaf, Pine tea, Qishr, Red clover tea, Red raspberry leaf, Roasted barley tea, Roasted wheat, Rooibos (Red Bush), Rose hip, Roselle petals (species of *Hibiscus*; aka Bissap, Dah, etc.), Rosemary, Sagebrush, California Sagebrush, Sage, Sakurayu, Salvia, Scorched rice, Skullcap, Serendib (tea), Sobacha, Spicebush (*Lindera benzoin*), Spruce tea, Staghorn sumac fruit, *Stevia*, St. John's Wort, Tea (*Camellia sinensis*), Thyme, Tulsi, Holy Basil, *Uncaria tomentosa*, commonly known as Cat's Claw, Valerian, *Verbena* (Vervains), Vetiver, Wax gourd, Wong Lo Kat, Woodruff, and/or Yarrow.

In some embodiments of the invention, the plant is for example selected from the group consisting of medicinal plants such as:

Açai (*Euterpe oleracea*, Alfalfa (*Medicago sativa*), Arnica (*Arnica Montana*, Asthma weed (*Euphorbia hirta*), Astragalus (*Astragalus propinquus*), Barberry (*Berberis vulgaris*), Belladonna (*Atropa belladonna*, Bilberry (*Vaccinium myrtillus*), Bitter gourd (*Momordica charantia*), Bitter leaf (*Vernonia amygdalina*), Bitter orange (*Citrus×aurantium*), Black cohosh (*Actaea racemosa*), Blessed thistle (*Cnicus benedictus*), Blueberries (genus *Vaccinium*), Burdock (*Arctium lappa*), Cat's claw (*Uncaria tomentosa*), Cayenne (*Capsicum annuum*), Celery (*Apium graveolens*), Chamomille (*Matricaria recutita* and *Anthemis nobilis*), Chaparral (*Larrea tridentata*), Chasteberry (*Vitex agnus-castus*), Chili (*Capsicum frutescens*), Cinchona, Clove (*Syzygium aromaticum*), Coffee senna (*Cassia occidentalis*), Comfrey (*Symphytum officinale*), Cranberry (*Vaccinium macrocarpon*), Dandelion (*Taraxacum officinale*), Dong quai (*Angelica sinensis*), Elderberry (*Sambucus nigra*), Eucalyptus (*Eucalyptus globulus*), European Mistletoe (*Viscum album*), Evening primrose (*Oenothera* spp.), Fenugreek (*Trigonella foenum-graecum*), Feverfew (*Tanacetum parthenium*), Flaxseed (*Linum usitalissimum*), Garlic (*Allium sativum*), Ginger (*Zingiber officinale*), Gingko (*Gingko biloba*), Ginseng (*Panax ginseng* and *Panax quinquefolius*), Goldenseal (*Hydrastis canadensis*), Grape (*Vitis vinifera*), Guava (*Psidium guajava*), Hawthorn (specifically *Crataegus monogyna* and *Crataegus laevigata*), Hoodia (*Hoodia gordonii*), Horse chestnut (*Aesculus hippocastanum*), Horsetail (*Equisetum arvense*), Jamaica dogwood (*Piscidia erythrina* or *Piscidia piscipula*), Kava (*Piper methysticum*), Kha, Konjac (*Amorphophallus konjac*), Kratom (*Mitragyna speciosa*), Kanna (*Sceletium tortuosum*), Lavender (*Lavandula angustifolia*), Lemon (*Citrus limon*), Licorice root (*Glycyrrhiza glabra*), Marigold (*Calendula officinalis*), Marsh mallow (*Althaea officinalis*), Milk thistle (*Silybum marianum*), Neem (*Azadirachta indica*), Noni (*Morinda citrifolia*), Oregano (*Origanum vulgare*), Papaya (*Carica papaya*), Peppermint (*Mentha×piperita*), Purple coneflower (*Echinacea purpurea*), Passion Flower (*Passiflora*), Red clover (*Trifolium pratense*), Rosemary (*Rosmarinus officinalis*), Sage (*Salvia officinalis*), Syrian Rue (aka Harmal) (*Peganum harmala*), St. John's wort (*Hypericum perforatum*), Saw palmetto (*Serenoa repens*), Thunder God Vine (*Tripterygium wilfordii*), Thyme (*Thymus vulgaris*), Tulasi (*Ocimum tenuiflorum* or Holy Basil), Turmeric (*Curcuma longa*), Umckaloabo (*Pelargonium sidoides*), Valerian (*Valeriana officinalis*), White willow (*Salix alba*), and/or Yerba santa (*Eriodictyon crassifolium*).

As disclosed herein, mixtures of the above-mentioned culinary, herbal and/or medicinal plants are also included as part of the invention.

In a preferred embodiment of the invention, the plant is tea (*Camellia sinensis*), including white tea, yellow tea, green tea, oolong tea, black tea, and/or pu-erh tea, and the like, including mixtures or blends thereof.

In one embodiment, the composition of the invention (either for making a drink or as a mixture of herbs and spices) comprises a layer of fibrous plant product, wherein the fibrous plant product comprises a blend of different plants.

In one embodiment, the composition of the invention (either for making a drink or as a mixture of herbs and spices) comprises a plant extract, wherein the plant extract comprises a blend of different plants.

In another embodiment, the composition comprises a layer of fibrous plant product and a plant extract applied thereto, wherein the fibrous plant product comprises a blend of different plants and the plant extract comprises a blend of different plants, or wherein the fibrous plant product comprises a single plant and the plant extract comprises a blend of different plants, or wherein the fibrous plant product comprises a blend of different plants and the plant extract comprises a single plant.

In another embodiment of the composition, the layer of fibrous plant product and the plant extract are from the same plant or from different plants.

In one embodiment of the invention, the layer of fibrous plant product of the composition comprises at least 70% (w/w) of fibrous plant product from one plant.

In one embodiment of the invention, the plant extract comprises at least 70% (w/w) of a plant extract from one plant. In another embodiment, the composition comprises at least 70% of fibrous plant product, preferably where the at least 70% of a plant extract is from tea.

The herbal and/or vegetable composition is preferably a composition for culinary use or for use in cooking, i.e. as a herb and spice mixture instead of a conventional bouquet garni.

A conventional bouquet garni is a bundle of herbs usually tied together with string and mainly used to prepare soup, stock, and various stews (herb and spice mixture). The bouquet is cooked with the other ingredients but is removed prior to consumption. Sometimes, the bouquet garni is not bound with string but its ingredients are filled into a small sachet, a net, or even a tea strainer, instead. Traditionally, the aromatics are bound within leek leaves, though a coffee filter (or cheesecloth) and butcher twine can be used, instead.

The herbal and/or vegetable composition or bouquet garni of the invention may be used instead of a traditional bouquet garni. The herbal and/or vegetable composition or bouquet garni of the invention is either made from a single herb or vegetable (such as parsley, thyme, bay leaf, basil, burnet, chervil, rosemary, peppercorns, savory and tarragon, carrot, celery (leaves or stem), celeriac, leek, onion and parsley root) or from a mixture of herbs and/or vegetables. If a mixture of herbs and/or vegetables is used, the composition may be used as a new form of a bouquet garni ("garnished bouquet"). In one embodiment, the herbs for the bouquet garni of the invention are parsley, thyme and bay leaf. In another embodiment, and depending on the recipe, the bouquet garni may also include basil, burnet, chervil, rosemary, peppercorns, savory and tarragon. Vegetables such as carrot, celery (leaves or stem), celeriac, leek, onion and parsley root are sometimes included in the bouquet garni of the invention.

A further embodiment of the invention relates to a method for producing the composition for making a beverage of the present invention. For example, the method comprises the steps of:
  a) extracting components of at least one plant with a solvent;
  b) separating the soluble portion (plant extract) from the non-soluble portion (solid plant particles);
  c) optionally refining the non-soluble portion;
  d) preparing a sheet-like product from the non-soluble portion;
  e) optionally concentrating the soluble portion;
  f) applying the soluble portion of step b) or concentrated soluble portion of step e) to the sheet of step d); and
  g) drying the product of step f) to obtain the composition for making a beverage.

In one embodiment of the invention, one or more plant components (plant material or plant funish) such as, for example, stems, scraps, leaves, fines, dust and/or shorts, are initially mixed with a solvent (e.g., water and/or other compounds) at elevated temperatures. For example, various solvents that are water-miscible, such as alcohols (e.g., ethanol), can be combined with water to form an aqueous solvent. The water content of the aqueous solvent can, in some instances, be greater than 50% by weight of the solvent. In one embodiment, the water content is 70%, 80%, 90% or 100%. Deionized water, distilled water or tap water may be employed. The amount of the solvent in the suspension can vary widely, but is generally added in an amount from about 75% to about 99% by weight of the suspension. However, the amount of solvent can vary with the nature of the solvent, the temperature at which the extraction is to be carried out, and the type of plant components.

After forming the solvent/plant furnish mixture, some or all of a soluble extracts fraction of the furnish mixture may be optionally separated (e.g., extracted) from the mixture. If desired, the aqueous solvent/plant furnish mixture can be agitated during extraction by stirring, shaking or otherwise mixing the mixture in order to increase the rate of extraction. Typically, extraction is carried out for about 0.5 hours to about 6 hours. Moreover, although not required, typical extraction temperatures range from about 10° C. to about 100° C.

Prior to the extraction step an optional grinding or cutting step can be used, in order to shred the plant or plant part and thus to break the plant's cell walls.

Once separated from the insoluble residue fraction of the plant solution, the soluble extracts fraction can optionally be concentrated using any known type of concentrator, such as a vacuum evaporator. In one embodiment, the soluble component may be highly concentrated. Moreover, the concentrated or unconcentrated soluble extracts fraction can be utilized in any manner desired. For example, the soluble extracts fraction can be utilized as a flavouring material or a portion can be added to the insoluble residue fraction.

Once extracted, the insoluble residue fraction can optionally be subjected to one or more mechanical refiners to produce a fibrous pulp. Some examples of suitable refiners can include disc refiners, conical refiners, and the like. The insoluble residue fraction can be utilized in any manner desired. For example, the insoluble residue fraction can be used as a flavouring material, used to produce a composition of the invention, which is herein also referred to as reconstituted plant material.

To produce a composition of the invention, the insoluble residue fraction is transferred to a papermaking station. The papermaking station includes a forming apparatus, which may include, for example, a forming wire, gravity drain, suction drain, felt press, Yankee dryer, drum dryers, etc. In general, the insoluble residue fraction may be in the form of a pulp. In the forming apparatus, the pulp is laid onto a wire belt forming a sheet-like shape. Excess water is removed from the tobacco sheet using gravity drains, suction drains, presses, and dryers. Thereafter, if desired, a portion of the soluble extracts fraction may be reapplied to the insoluble residue fraction. When the insoluble residue fraction is recombined with the soluble extracts fraction, the resulting plant product is generally referred to as "reconstituted plant material."

Reconstituted plant material can generally be formed in a variety of ways. For instance, in one embodiment, band casting can be utilized to form the reconstituted plant material. Band casting typically employs a slurry of finely divided plant parts mixed with a binder such as gum arabic, guar gum, alginate, xanthan, cellulose and cellulose derivatives (such as carboxy methyl cellulose (CMC), hydroxypropyl methyl cellulose (HPMC)), pectines or starch that is coated onto a steel band and then dried. In one embodiment, the method is performed according to a process similar to the conventional tobacco reconstitution process, which is for example described in U.S. Pat. Nos. 3,353,541; 3,420,241; 3,386,449; 3,760,815; and 4,674,519; which are incorporated herein in their entirety by reference thereto. The method for producing the products of the invention can also be performed by a papermaking process, in order to reconstitute any plant components (such as stems, scraps, leaves, fines, dust and/or shorts) into a paper-like product. Some examples of such processes are described in U.S. Pat. Nos. 3,428,053; 3,415,253; 3,561,451; 3,467,109; 3,483,874; 3,860,012; 3,847,164; 4,182,349; 5,715,844; 5,724,998; and 5,765,570; which are also incorporated herein in their entirety by reference thereto for all purposes. For example, the formation of the products of the invention using papermaking techniques can involve the steps of mixing fruits, herbs, medicinal plants, tea, vegetables and/or spices with water, extracting the soluble ingredients therefrom, concentrating the soluble ingredients, refining the fruits, herbs, medicinal plants, tea, vegetables and/or spices, forming a web, reapplying the concentrated soluble ingredients, drying, and threshing.

In the method of the invention, more specifically with respect to the non-soluble portion (solid plant particles) used in providing the non-impregnated fiber web of the invention, ie. the sheet-like product in step d), the plant is not tobacco, wood pulp, cotton, textiles, jute flax, Indian hemp, hemp, hoopvine, kenaf, nettles, ramie, abacá, bamboo fiber, banana (especially banana bark), bowstring hemp, coir (fiber from the coconut shell), esparto, henequen, kapok, milkweed, *papaya*, phormium ("New Zealand Flax"), sisal, raffia, bagasse, pina, aibika or yucca. However, a mixture of a plant mentioned herein in connection with the present invention with any of the aforementioned plants may be utilized. Further to the foregoing listed materials also others materials can be added to improve product physical characteristics, for example cellulose derivatives such as methylcellulose, carboxymethyl cellulose (CMC), hydroxypropyl methyl cellulose (HPMC), starch and starch derivatives such as oxidatively degraded starch, polysaccharides (and their derivatives) such as pectines, gelatins, guar gum, agar, alginates, carrageenans, or synthetic fibers such as the ones made of vinyl chloride or vinyl acetate, polyethylene, polypropylene, polyesters.

Once extracted, the insoluble, solids portion can optionally be subjected to one or more mechanical refiners to produce a fibrous pulp. Some examples of suitable refiners can include disc refiners, conical refiners, and the like, well known to a skilled person. The pulp from the refiner can then be transferred to a papermaking station (not shown) that includes a forming apparatus, which may include, for example, a forming wire, gravity drain, suction drain, felt press, Yankee dryer, drum dryers, etc. In such a forming apparatus, the pulp is laid onto a wire belt forming a sheet-like shape and excess water is removed by the gravity drain and suction drain and presses. Once separated from the insoluble portion of the plant solution (plant extract), the soluble portion can optionally be concentrated using any known type of concentrator, such as a vacuum evaporator.

In some embodiments of the invention, a wet strength agent may be added to the fibrous portion in order to reduce potential degradation of the reconstituted material when it is brought into contact with a liquid (e.g. water), such as upon infusion in water. Any suitable wet strength agent preferably selected for food applications may be used such as polyamide-epichlorohydrin resins, polyamine-epichlorohydrin resins, poly(aminoamide)-epichlorohydrin resins, urea-formaldehyde resins; melamine-formaldehyde resins; alkyl ketene dimer; alkyl succinic anhydride; polyvinylamines; oxidized polysaccharides (such as oxidatively degraded starch); glyoxalated polyacrylamide resins; polyimines such as polyethyleneimine. Wet strength agents are well known to the skilled person and described in Ingredients Standards, such as BFR (Bundesinstitut für Risikobewertung) XXXVI and BFR XXXVI/1 or FDA (Food & Drug Administration) 21 CFR 176.170, FDA 21 CFR 176.110, FDA 21 CFR 176.120, FDA 21 CFR 176.1180. The wet strength agent is for example used in an amount of about 0.1% w/w to about 20% w/w, preferably of about 1% w/w to about 10% w/w, more preferably of about 5% w/w. The wet strength agent is preferably added to the fibrous portion when or before making the sheet-like product (see step d) above).

In one embodiment, the water used for extraction is hot water, preferably of about 30 to 100° C., 40 to 90° C., or 50- to 80° C., or more preferably of about 70° C.

In one embodiment, the coating ratio of solubles portion onto the fiber web is about 5% to 80% (w/w), 10 to 70% (w/w), or more preferably between 20 and 50% (w/w). In some embodiments, the coating ratio or soluble portion that is added back to the base web (fiber web) is similar to the portion of soluble material contained in and extracted from the original plant (so called "standard level").

In one embodiment, the base weight of the final product is about 20 to about 200 g/m² (dry basis), more preferably about 90 to about 120 g/m².

The extraction time depends on the fruits, herbs, medicinal plants, tea, vegetables and/or spices subjected to the extraction process. In one embodiment of the invention, the extraction time is about 15 to 60 minutes, preferably 45 minutes.

In one embodiment of the method of the invention, the extracting step is performed using components of a blend of plants, in another embodiment, extracting step is performed using components of a single plant.

Extraction may also be performed by means other than using hot water, namely by extraction with supercritical gases, such as carbon dioxide, or by using, for example, ethanol, hexane, acetone, R134a (1,1,1,2-tetrafluoroethane), carbon dioxide and hydrofluorocarbons. In one embodiment, the extraction can be carried out by using at least one solvent at room temperature and under atmospheric pressure. Extraction may also be performed by using a mixture of different solvents. In another embodiment, extraction may be performed using at least one solvent, such as for example R134a or carbon dioxide, at different temperatures and at different pressures and different states (liquid or gaseous). For example, extraction may be performed using solvents in a liquid state (such as solvent that are volatile or non-volatile at room temperature), in a subcritical state (such as water at a temperature above 100° C. and a pressure above 1 bar), or in a supercritical state (such as carbon dioxide at a temperature above 31° C. and a pressure above 73 bar).

Certain plants may require specific extraction conditions (time, temperature, solid/liquid ratio) due to the ingredients contained therein, which may be temperature sensitive or must not be subjected to certain extraction conditions. For example, extraction of lycopene from tomatoes we must be performed by using specific enzymes to liberate the product from tomatoes cells. In connection with the present invention, processing aids may be used to improve extraction, such as pH modifiers (such as, for example, NaOH or organic acids), microwaves, pressure, ultrasound, enzymes such as for example proteases, amylases, cellulases, and/or pectinases. Whenever reference is made herein to "extraction", the term includes the aforementioned alternative extraction means. The extraction used in connection with the present invention can be performed in a continuous or discontinuous matter. The extraction conditions are well known to the skilled artisan and described in standard text books, such as Handbook of Separation Techniques for Chemical Engineers, Third Edition (March 1997), Philip A. Schweitzer, McGraw-Hill Inc.

In one embodiment, the extraction and/or pressing may be performed using at least a portion of the plant material, fresh, frozen or dried, or selected from roots, bark, seeds, stems, leaves, flowers and fruit.

Separation of the soluble portion (plant extract) from the non-soluble portion (solid plant particles) can be performed by separating the liquid phase from the solid phase, such as by filtration, with or without pressure, by centrifugation or other methods commonly used in the laboratory and well-known to the skilled person.

In a preferred embodiment of the invention, the plant used in the method of the invention is tea (*Camellia sinensis*), and the extraction is performed for about 45 minutes with water at about 70° C.

In one embodiment of the method where a mixture or blend of plants is used, the non-soluble portion of the plant is mixed with the non-soluble portion of at least one further plant prior to preparing the sheet.

Certain embodiments of the method of the invention use the soluble portion of step b) or concentrated soluble portion of step e), which is mixed with the soluble portion or concentrated soluble portion of at least one further plant prior to applying the soluble portion or concentrated soluble portion to the sheet.

For certain applications it is desirable to adjust the composition by adding or removing ingredients or components to or from the plant extract and/or the non-soluble plant particles prior to producing the final product of the invention. Such adjustment may be performed to modify/improve chemical, physical and/or sensory characteristics of the finished product. The invention thus encompasses methods, further comprising the step of adding or removing ingredients from the soluble portion (plant extract) and/or from the non-soluble portion (solid plant particles) prior to applying the soluble portion of step b) or concentrated soluble portion of step e) to the sheet of step d).

In some embodiments, the sheet or sheet-like product which is obtained in step g) is a web or fiber-web. The sheet-like product or web may be used in different sizes and shapes. In some cases, the composition of step g) is further cut or broken into small regularly or irregularly shaped forms. Alternatively, the composition is brought or formed into any desired shapes, dimensions and formats, such as sheets, leafs (or leaf-like shapes), sticks, bands, cups, mugs, bowls, flasks, kettles, bottles or the like, straws or tubes, discs or sheets and the like, as described below. In addition to cutting or breaking the sheet or fibrous web to a desired size and/or shape or forming the same into to a desired size and/or shape, it may be dried to the desired final moisture content.

In accordance with the present invention the plant is selected from the group consisting of fruits, herbs, medicinal plants, tea, vegetables and spices, including mixtures thereof, such as mixtures of herbs and vegetables. In one embodiment, the fruits, herbs, medicinal plants, tea, vegetables and spices are for example selected from artemisia, balm, basil, chamomile, chive, cloves, coffee, coriander, dill, garlic, ginger, *ginseng, gingko,* jasmine, lavender, mint, orange blossom, persil, rooibos, *rosa centifolia,* rosemary, thyme, turmeric, sage, pepper, chili pepper, *stevia rebaudiana,* tarragon, white tea, yellow tea, green tea, oolong tea, black tea, pu-erh tea, *vanilla,* red or green vine, violet and/or willow.

In some embodiments of the invention, the plant is for example selected from the group consisting of culinary herbs and spices such as:

Ajwain, carom seeds (*Trachyspermum ammi*), Akudjura (*Solanum centrale*), Alexanders (*Smyrnium olusatrum*), Alkanet (*Alkanna tinctoria*), Alligator pepper, mbongo spice (mbongochobi), hepper pepper (*Aframomum danielli, A. citratum, A. exscapum*), Allspice (*Pimenta dioica*), Angelica (*Angelica archangelica*), Anise (*Pimpinella anisum*), Aniseed myrtle (*Syzygium anisatum*), Annatto (*Bixa orellana*), Apple mint (*Mentha suaveolens*), Asafoetida (*Ferula assafoetida*), Asarabacca (*Asarum europaeum*), Avens (*Geum urbanum*), Avocado leaf (*Peresea americana*), Barberry (*Berberis vulgaris* and other *Berberis* spp.), Basil, sweet (*Ocimum basilicum*), Basil, lemon (*Ocimum×citriodorum*), Basil, Thai (*O. basilicum* var. *thyrsiflora*), Basil, Holy (*Ocimum tenuiflorum*), Bay leaf (*Laurus nobilis*), Bay leaf Indian, tejpat, malabathrum, Boldo (*Peumus boldus*), Borage (*Borago officinalis*), Black cardamom (*Amomum subulatum, Amomum costatum*), Black mustard (*Brassica nigra*), Blue fenugreek, blue melilot (*Trigonella caerulea*), Brown mustard (*Brassica juncea*), Caraway (*Carum carvi*), Cardamom (*Elettaria cardamomum*), Carob (*Ceratonia siliqua*), Catnip (*Nepeta cataria*), Cassia (*Cinnamomum aromaticum*), Cayenne pepper (*Capsicum annuum*), Celery leaf (*Apium graveolens*), Celery seed (*Apium graveolens*), Chervil (*Anthriscus cerefolium*), Chicory (*Cichorium intybus*), Chili pepper (*Capsicum* spp.), Chives (*Allium schoenoprasum*), Cicely, sweet cicely (*Myrrhis odorata*), Cilantro, coriander greens, coriander herb (*Coriandrum sativum*), Cinnamon, Indonesian (*Cinnamomum burmannii, Cassia vera*), Cinnamon, Saigon or Vietnamese (*Cinnamomum loureiroi*), Cinnamon, true or Ceylon (*Cinnamomum verum, C. zeylanicum*), Cinnamon, white (*Canella winterana*), Cinnamon myrtle (*Backhousia myrtifolia*), Clary, Clary sage (*Salvia sclarea*), Clove (*Syzygium aromaticum*), Coriander seed (*Coriandrum sativum*), Costmary (*Tanacetum balsamita*), Cuban oregano (*Plectranthus amboinicus*), Cubeb pepper (*Piper cubeba*), Cudweed (*Gnaphalium* spp.), Culantro, culangot, long coriander (*Eryngium foetidum*), Cumin (*Cuminum cyminum*), Curry leaf (*Murraya koenigii*), Curry plant (*Helichrysum italicum*), Dill seed (*Anethum graveolens*), Dill herb or weed (*Anethum graveolens*), Elderflower (*Sambucus* spp.), Epazote (*Dysphania ambrosioides*), Fennel (*Foeniculum vulgare*), Fenugreek (*Trigonella foenum-graecum*), Filé powder, gumbo filé (*Sassafras albidum*), Fingerroot, krachai, temu kuntji (*Boesenbergia rotunda*), Galangal, greater (*Alpinia galanga*), Galangal, lesser (*Alpinia officinarum*), Galingale (*Cyperus* spp.), Garlic chives (*Allium tuberosum*), Garlic (*Allium sativum*), Garlic, elephant (*Allium ampeloprasum* var. *ampeloprasum*), Ginger (*Zingiber officinale*), Ginger, torch, bunga siantan (*Etlingera elatior*) (Indonesia), Golpar, Persian hogweed (*Heracleum persicum*) (Iran), Grains of paradise (*Aframomum melegueta*), Grains of Selim, Kani pepper (*Xylopia aethiopica*), Horseradish (*Armoracia rusticana*), Hlouttuynia cordata (Vietnam), Huacatay, Mexican marigold, mint marigold (*Tageles minuta*), Hyssop (*Hyssopus officinalis*), Indonesian bay leaf, daun salam (*Syzygium polyanthum*), Jasmine flowers (*Jasminum* spp.), Jimbu (*Allium hypsistum*) (Nepal), Juniper berry (*Juniperus communis*), Kaffir lime leaves, Makrud lime leaves (*Citrus hystrix*) (Southeast Asia), Kala zeera (or kala jira), black cumin (*Bunium persicum*) (South Asia), Kawakawa seeds (*Macropiper excelsum*) (New Zealand), Kencur, galangal, kentur (*Kaempferia galanga*), Keluak, kluwak, kepayang (*Pangium edule*), Kinh gioi, Vietnamese balm (*Elsholtzia ciliata*), Kokam seed (*Garcinia indica*) (Indian confectionery), Korarima, Ethiopian cardamom, false cardamom (*Aframomum corrorima*) (Eritrea), Koseret leaves (*Lippia adoensis*) (Ethiopia), Lavender (*Lavandula* spp.), Lemon balm (*Melissa officinalis*), Lemongrass (*Cymbopogon citratus, C. flexuosus,* and other *Cymbopogon* spp.), Lemon ironbark (*Eucalyptus staigeriana*) (Australia), Lemon myrtle (*Backhousia citriodora*) (Australia), Lemon verbena (*Lippia citriodora*), Leptotes bicolor (Paraguay and southern Brazil), Lesser calamint (*Calamintha nepeta*), nipitella, nepitella (Italy), Licorice, liquorice (*Glycyrrhiza glabra*), Lime flower, linden flower (*Tilia* spp.), Lovage (*Levisticum officinale*), Mace (*Myristica fragrans*), Mahlab, St. Lucie cherry (*Prunus mahaleb*), Marjoram (*Origanum majorana*), Marsh mallow (*Althaea officinalis*), Mastic (*Pistacia lentiscus*), Mint (*Mentha* spp.) 25 species, hundreds of varieties, Mountain horopito (*Pseudowintera colorala*) 'Pepperplant' (New Zealand), Musk mallow, abelmosk (*Abelmoschus moschatus*), Mustard, black, mustard plant, mustard seed (*Brassica nigra*), Mustard, brown, mustard plant, mustard seed (*Brassica juncea*), Mustard, white, mustard plant, mustard seed (*Sinapis alba*), Nasturtium (*Tropaeolum matjus*), Nigella, kalonji, black caraway, black onion seed (*Nigella sativa*), Njangsa, djansang (*Ricinodendron heudelotii*) (West Africa), Nutmeg (*Myrislica fragrans*), Neem, *Olida* (*Eucalyptus olida*) (Australia), Oregano (*Origanum vulgare, O. heracleoticum,* and other species), Orris root (*Iris germanica, I. florentina, I. pallida*), Pandan flower, kewra (*Pandanus odoratissimus*), Pandan leaf, screwpine (*Pandanus amaryllifolius,* Paprika (*Capsicum annuum*), Paracress (*Spilanthes acmella,* Soleracea) (Brazil), Parsley (*Petroselinum crispum*), Pepper: black, white, and green (*Piper nigrum*), Pepper, Dorrigo (*Tasmannia stipitata*) (Australia), Pepper, long (*Piper longum*), Pepper, mountain, Cornish pepper leaf (*Tasmannia lanceolata*), Peppermint (*Mentha piperata*), Peppermint gum leaf (*Eucalyptus dives*), Perilla, shiso (*Perilla* spp.), Peruvian pepper (*Schinus molle*), *Pandanus amaryllifolius,* Brazilian pepper or Pink pepper (*Schinus terebinthifolius*), Quassia (*Quassia amara*) (bitter spice in aperitifs and some beers and fortified wines), Ramsons, wood garlic (*Allium ursinum*), Rice paddy herb (*Limnophila aromatica*) (Vietnam), Rosemary (*Rosmarinus oficinalis*), Rue (*Ruta graveolens*), Safflower (*Carthamus tinctorius*), for yellow color, Saffron (*Crocus sativus*), Sage (*Salvia oficinalis*), Saigon cinnamon (*Cinnamomum loureiroi*), Salad burnet (*Sanguisorba minor*), Salep (*Orchis mascula*), Sassafras (*Sassafras albidum*), Savory, summer (*Satureja hortensis*), Savory, winter (*Satureja montana*), Silphium, silphion, laser, laserpicium, lasarpicium (Ancient Roman cuisine, Ancient Greek cuisine), Shiso (*Perilla frutescens*), Sorrel (*Rumex acetosa*), Sorrel, sheep (*Rumex acetosella*), Spearmint (*Mentha spicata*), Spikenard (*Nardoslachys grandiflora* or *N. jatamansi*), Star anise (*Illicium verum*), Sumac (*Rhus coriaria*), Sweet woodruff (*Galium odoratum*), Szechuan pepper, Sichuan pepper (*Zanthoxylum piperitum*), Tarragon (*Artemisia dracunculus*), Thyme (*Thymus vulgaris*), Thyme, lemon (*Thymus×citriodorus*), Turmeric (*Curcuma longa*), Vanilla (*Vanilla plani-*

*folia*), Vietnamese cinnamon (*Cinnamomum loureiroi*), Vietnamese coriander (*Persicaria odorata*), Voatsiperifery (*Piper borbonense*), Wasabi (*Wasabia japonica*), Waterpepper, smartweed (*Polygonum hydropiper*), Watercress (*Rorippa nasturtium-aqualica*), Wattleseed (from about 120 spp. of Australian *Acacia*), White mustard (*Sinapis alba*), Wild betel (*Piper sarmentosum*) (Southeast Asia), Wild thyme (*Thymus serpyllum*), Willow herb (*Epilobium parviflorum*), Winter savory (*Satureja montana*), Wintergreen (*Gaultheria procumbens*), Wood avens, herb bennet (*Geum urbanum*), Woodruff (*Galium odoratum*), Wormwood, absinthe (*Artemisia absinthium*), Yellow mustard (*Brassica hirta=Sinapis alba*), Yerba buena, any of four different species, many unrelated, Za'atar (herbs from the genera *Origanum, Calamintha, Thymus*, and/or *Satureja*), Zedoary (*Curcuma zedoaria*).

In some embodiments of the invention, the plant is selected from the group consisting of teas and herbal teas such as:

Anise tea (seeds or leaves), Asiatic penny-wort leaf, Artichoke tea, Bee Balm, Boldo, Burdock, Caraway tea, Catnip tea, Chamomile tea, Che Dang tea (*Ilex causue* leaves), Chinese knot-weed tea, Chrysanthemum tea, Cinnamon, Coca tea, Coffee tea leaves and coffee cherry tea, Cerasse, Citrus peel (including bergamot, lemon and orange peel), Dandelion coffee, Dill tea, Echinacea tea, Elderberry, European Mistletoe (*Viscum album*), Essiac tea, Fennel, Gentian, Ginger root, *Ginseng*, Goji, Hawthorn, *Hibiscus*, Ho Yan Hor Herbal Tea, Honeybush, Horehound, Houttuynia, *Hydrangea* tea (*Hydrangea serrata* Amacha), Jiaogulan, Kapor tea, Kava root, Kratom, Kuzuyu, Labrador tea, Lapacho (also known as Taheebo), Lemon Balm, Lemon and ginger tea, Lemon grass, Luo han guo, Licorice root, Lime blossom, Mint, Mountain Tea, Neem leaf, Nettle leaf, New Jersey Tea, Noni tea, Oksusu cha, Pennyroyal leaf, Pine tea, Qishr, Red clover tea, Red raspberry leaf, Roasted barley tea, Roasted wheat, Rooibos (Red Bush), Rose hip, Roselle petals (species of *Hibiscus*; aka Bissap, Dah, etc.), Rosemary, Sagebrush, California Sagebrush, Sage, Sakurayu, Salvia, Scorched rice, Skullcap, Serendib (tea), Sobacha, Spicebush (*Lindera benzoin*), Spruce tea, Staghorn sumac fruit, *Stevia*, St. John's Wort, Tea (*Camellia sinensis*), Thyme, Tulsi, Holy Basil, *Uncaria tomentosa*, commonly known as Cat's Claw, Valerian, *Verbena* (Vervains), Vetiver, Wax gourd, Wong Lo Kat, Woodruff, and/or Yarrow.

In some embodiments of the invention, the plant is for example selected from the group consisting of medicinal plants such as:

Açai (*Euterpe oleracea*, Alfalfa (*Medicago sativa*), Arnica (*Arnica Montana*, Asthma weed (*Euphorbia hirta*), *Astragalus* (*Astragalus propinquus*), Barberry (*Berberis vulgaris*), *Belladonna* (*Atropa belladonna*, Bilberry (*Vaccinium myrtillus*), Bitter gourd (*Momordica charantia*), Bitter leaf (*Vernonia amygdalina*), Bitter orange (*Citrus×aurantium*), Black cohosh (*Actaea racemosa*), Blessed thistle (*Cnicus benedictus*), Blueberries (genus *Vaccinium*), Burdock (*Arctium lappa*), Cat's claw (*Uncaria tomentosa*), Cayenne (*Capsicum annuum*), Celery (*Apium graveolens*), Chamomille (*Matricaria recutita* and *Anthemis nobilis*), Chaparral (*Larrea tridentata*), Chasteberry (*Vitex agnus-castus*), Chili (*Capsicum frutescens*), Cinchona, Clove (*Syzygium aromaticum*), Coffee senna (*Cassia occidentalis*), Comfrey (*Symphytum officinale*), Cranberry (*Vaccinium macrocarpon*), Dandelion (*Taraxacum officinale*), Dong quai (*Angelica sinensis*), Elderberry (*Sambucus nigra*), Eucalyptus (*Eucalyptus globulus*), European Mistletoe (*Viscum album*), Evening primrose (*Oenothera* spp.), Fenugreek (*Trigonella foenum-graecum*), Feverfew (*Tanacetum parthenium*), Flaxseed (*Linum usitatissimum*), Garlic (*Allium sativum*), Ginger (*Zingiber officinale*), Gingko (*Gingko biloba*), Ginseng (*Panax ginseng* and *Panax quinquefolius*), Goldenseal (*Hydrastis canadensis*), Grape (*Vitis vinifera*), Guava (*Psidium guajava*), Hawthorn (specifically *Crataegus monogyna* and *Crataegus laevigata*), Hoodia (*Hoodia gordonii*), Horse chestnut (*Aesculus hippocastanum*), Horsetail (*Equisetum arvense*), Jamaica dogwood (*Piscidia erythrina* or *Piscidia piscipula*), Kava (*Piper methysticum*), Kha, Konjac (*Amorphophallus konjac*), Kratom (*Mitragyna speciosa*), Kanna (*Sceletium tortuosum*), Lavender (*Lavandula angustifolia*), Lemon (*Citrus limon*), Licorice root (*Glycyrrhiza glabra*), Marigold (*Calendula officinalis*), Marsh mallow (*Althaea officinalis*), Milk thistle (*Silybum marianum*), Neem (*Azadirachta indica*), Noni (*Morinda citrifolia*), Oregano (*Origanum vulgare*), Papaya (*Carica papaya*), Peppermint (*Mentha×piperita*), Purple coneflower (*Echinacea purpurea*), Passion Flower (*Passiflora*), Red clover (*Trifolium pratense*), Rosemary (*Rosmarinus officinalis*), Sage (*Salvia officinalis*), Syrian Rue (aka Harmal) (*Peganum harmala*), St. John's wort (*Hypericum perforatum*), Saw palmetto (*Serenoa repens*), Thunder God Vine (*Tripterygium wilfordii*), Thyme (*Thymus vulgaris*), Tulasi (*Ocimum tenuiflorum* or Holy Basil), Turmeric (*Curcuma longa*), Umckaloabo (*Pelargonium sidoides*), Valerian (*Valeriana officinalis*), White willow (*Salix alba*), and/or Yerba santa (*Eriodictyon crassifolium*).

As disclosed herein, mixtures of the above-mentioned culinary, herbal and/or medicinal plants are also included as part of the invention.

In a preferred embodiment of the invention, the plant is tea (*Camellia sinensis*), including white tea, yellow tea, green tea, oolong tea, black tea, and/or pu-erh tea, and the like, including mixtures or blends thereof.

In a further embodiment, the invention relates to a fiber-web comprising from about 5% to about 100% (w/w)), preferably at least 10%, at least 20%, at least 30%, at least 40%, at least 50%, at least 60%, at least 70%, at least 80%, at least 90%, or 100%, fibers of fruits, herbs, medicinal plants, tea, vegetables and/or spices. In one embodiment, the fiber-web further comprises cellulosic and/or synthetic fibers, and fibers of fruits, herbs, medicinal plants, tea, vegetables and/or spices in a ratio of for example: 40/60 (w/w), 60/40 (w/w) or 20/80 (w/w). In another embodiment of the invention, the fiber-web of the present invention is obtainable by the method disclosed herein, namely as an intermediate product in step d) of the said method.

The invention further relates to a composition for making a beverage (drink, tea etc.), obtainable by the method of the present invention disclosed herein.

The invention also includes the use of the composition of the invention for making a beverage (drink, tea etc.), or broth, or for culinary use or use in cooking, respectively, i.e. as a herb and spice mixture such as a bouquet garni instead of a conventional bouquet garni, as described in this description. Specifically, the invention includes the use of the composition of the invention for as a drink (beverage), as a food or food product, for culinary or cooking purposes, or for medicinal or aromatic applications and the like, as described above and in the following description and examples.

Also included is a beverage obtainable by contacting water with the composition of the invention.

In one embodiment of the invention, the fiber-web comprises from about 5% to about 100% (w/w)), preferably at least 10%, at least 20%, at least 30%, at least 40%, at least 50%, at least 60%, at least 70%, at least 80%, at least 90%, or 100%, fibers of fruits, herbs, medicinal plants, tea, vegetables and/or spices. For certain applications, the fiber-web may further comprise cellulosic and/or synthetic fibers. In a particular embodiment, the fiber-web comprises fibers of (i) fruits, herbs, medicinal plants, and/or tea, vegetables and/or spices and (ii) cellulosic fibers and/or synthetic fibers in a ratio of 40/60 (w/w), 60/40 (w/w) or 80/20 (w/w).

The invention further relates to a fiber-web, obtainable by the method of the invention, namely in step d).

In some embodiments of the invention, the fiber-web further comprises a coating or impregnation with soluble portion (plant extract) of fruits, herbs, medicinal plants, or tea.

The coating or impregnation is obtained by various methods known to the skilled person, such as applying to or treating the fiber-web or sheet-like structure with a plant extract, such as in a bath or by special application means, such as sprayers. In addition, various other ingredients, such as flavor or color treatments, can also be applied to the web. If applied with the soluble portion and/or other ingredients, the fibrous sheet material can, in some embodiments, then be dried using, for example, a tunnel dryer, to provide a sheet having a typical moisture content of less than 20% by weight, and particularly from about 9% to about 14% by weight.

The invention thus also relates to an impregnated or coated fiber-web, obtainable by the method of the invention, namely in step g).

According to a further embodiment, the fiber-web of the invention further comprises a coating or an impregnation with the soluble portion (plant extract) of said fruits, herbs, medicinal plants, or tea. In another embodiment of the invention, the fiber-web of the present invention is obtainable by the method disclosed herein, namely as the end product in step g) of said method.

In a further embodiment, the invention relates to a tea product or container, which is a tea bag comprising the fiber-web referred to herein, which is either impregnated with the soluble portion (plant extract) of said fruits, herbs, medicinal plants, or tea, or which is not impregnated. The tea bag may be empty or filled, ie. the tea bag may further comprise inside a sample or portion of fruits, herbs, medicinal plants, or tea, such as in the form of tea leaves, tea dust or the like. Even though the tea bag may be produced industrially on conventional tea bagging machines, in this embodiment, the product is made from entirely natural products, most preferably the same plant or herb as the one used for making the beverage, wherein the product avoids using conventional cellulose-based tea bags.

In one embodiment, the tea bag may be impregnated with tea extract, wherein said product provides an increased tea aroma when making the infusion, in particular when the tea bag is filled with, for example, tea leafs or tea dust. In a preferred embodiment, the tea bag comprising the fiber-web referred to herein, is impregnated with the soluble portion of a certain kind of tea (tea extract) and also filled with the same kind of tea, for example in the form of tea leafs or tea dust. Alternatively, the impregnation can be made using a different plant or herb as used for the filling of the bag, such as, for example, the rind of the bergamot orange, a fragrant citrus fruit typically used to provide the distinctive flavour and aroma of Earl Grey tea. In this case, Earl Grey tea products can be prepared from unflavoured tea leaves, simply by adding the flavour and aroma of the bergamotte orange in the form of the tea bag coating. This procedure facilitates the production process, as the tea company is not required to aromatize different batches of tea but can simply use non-aromatized tea instead, the latter of which is packaged into tea bags specifically aromatized using different impregnations. In another embodiment applying this principle, a mixture of teas and/or other plants can be utilized for making tea bags, where tea is placed into the tea bag, wherein the tea bag is made, for example, of mint leaves.

Alternatively, the tea product or container of the invention is provided in the form of a tea pod, tea pad or tea capsule instead of a tea bag, such as for either direct immersion or to be used in connection with conventional tea machines or coffee brewing machines (such as Nestlé Special.T®, or Nespresso®).

The products of the invention enable a more efficient infusion (100% solubles are extracted from the plant) in the sense that more solubles can be released than natural plant ingredients for a given weight of material. The products also provide a faster infusion (than with a conventional infusion made from the vegetal material in its natural non converted form). Specifically, the compositions of the invention have improved efficiency in boiling water or in non-heated water or water at room temperature.

The process for making the compositions of the invention also allows for specifically adjusting the final composition of the products, such as to remove from the soluble or the non-soluble portion(s) for example foreign matters, components altering taste and/or odor, or caffeine, nicotine, pesticides, aluminum, heavy metals, mycotoxins, toxicants and allergenic molecules such as coumarin, farnesol, geraniol, limonene, linalol, safrole, methyleugenol, or by adding to the soluble or the non-soluble portion(s) for example desirable additives, such as sweeteners, sugars, flavors, casings, vitamins, colorants, minerals, taste enhancers.

In another embodiment, the soluble portion in the reconstituted material of the invention can be precisely adjusted (decreased as compared to standard level, at standard level, or increased as compared to standard level). A key benefit is that the level of ingredients in the reconstituted material can be precisely increased to a level higher than in the original natural form, thus allowing for more concentrated (more intense) drinks, teas or broths. The adjustment of ingredients can also guarantee a consistent, standardized level of delivered ingredients to compensate natural variations of active ingredients in plants.

Preferably, the method of the invention also allows for reduction of undesired compounds from the material, such as to selectively remove undesired components (such as, for example but not limited to, natural ingredients, caffeine, nicotine, aluminum, heavy metals, pesticides, impurities or the like). For example, it is possible to remove components from either the soluble portion (plant extract) or from the non-soluble portion (solid plant particles) or both by liquid-liquid extraction, physical adsorption, centrifugation, chromatography, crystallization, decantation, by use of a demister, drying, distillation, electrophoresis, elutriation, evaporation, solid phase or liquid-liquid extraction, flotation, flocculation, filtration (for example using membranes), vapor-liquid separation, and/or sublimation and other means well known to the skilled person, preferably before applying the plant extract to the base web.

In connection with adding ingredients, extracts of different sources and origins, flavors, coloring agents or the like may be used, such as clorophyll, anthocyans, caramel, caroteinoids. For example, when using tea or herbs it is possible to include L-menthol at various quantities (such as 6% or 15%) in the finished product. Products so obtained have a distinctive taste and aroma of menthol. In one embodiment, eugenol, thymol or plant extracts/concentrates can be added to the reconstituted bouquet garni of the invention.

The present invention also allows to blend various plants and herbs. In one example, instead of using single plants, such as tea or mint leaves, tea may be replaced by a mixture of, for example, 50% tea and 50% mint leaves (w/w); 50% verbena and 50% mint (w/w); 30% cinnamon and 30% tea and 10% licorice and 10% chamomile and 10% red vine and 10% roobois (w/w); and many other combinations.

The combination of different plant materials through the reconstitution process into a single fiber web impregnated with extracts from different plants (the same plant or blends) offers new taste experiences and additive or synergistic effects. For example, it is known that combinations of certain plant extracts or combinations of certain plant ingredients have additive or synergistic effects, such as, for example, a mixture of hops and valerian extracts for use in treating insomnia and vigilance (Blumenthal and al., J. Herbal Medicine, expanded Commission E monographs, American Botanical Council, Austin, 2000, 394-400), or mixtures of oregano and cranberry extracts for use in treating *H. pylori* infections (Lin et al., Appl. Environ. Microbiol. December 2005, vol. 71, no. 12, 8558-8564), or different mixtures of extracts of *S. baicalensis, D. morifolium, G. uralensis* and *R. rubescens* tested for their additive or synergistic effect in prostate cancer cell lines (Adams et al., Evid Based Complement Alternat Med. 2006 March; 3(1): 117-124).

In the context of the present invention, the reconstituted plant material or product of the invention may be used to blend a single plant (or a mixture of different plants) together with natural materials, such as, for example, reconstituted black tea with natural tea material or reconstituted mint (*Mentha* spp.) with natural green tea material, in order to improve the quality (such as the chemical constitution, the consistency or sensory profile and characteristics) of the product or blend.

It has been found that some beverages are particularly less astringent and bitter when prepared from the reconstituted plant material or product of the invention as compared to original material from which the reconstituted plant material or product of the invention was prepared. This is, for example, the case for green tea, which is less astringent and bitter when made from a reconstituted green tea product according to the invention as compared to a conventional infusion of green tea.

The production method also provides for reducing microbiological load of the final products because of the high temperatures during the papermaking process.

The products of the invention provide a light material having a small surface, which allows economic packaging/shipping. For the consumer, the products of the invention are easy to transport and easy to use. Specifically, it has been found that the products of the invention are easily infusible in even cold water. This has particular advantages for consumers in cases where no heating or electricity is available for preparing hot water.

The products are further available in all shapes, dimensions and formats, such as sheets, leafs (or leaf-like shapes), sticks, bands, cups, mugs, bowls, flasks, kettles, bottles or the like, straws or tubes, discs or sheets and the like, and can be customized with a logo. These products are convenient for the customer to be put or dipped into hot or cold water to produce the beverage of interest. Alternatively, hot or cold water is poured into or injected into said cups, mugs, bowls, flasks, kettles, bottles or the like, to produce the beverage of interest. In the case of straws or tubes impregnated with the desired plant extract on the inner side of the straw or tube, infusion occurs when sucking cold or hot liquid (e.g. water) through the straw or tube. Alternatively, the straw or tube is simply placed in cold or hot water, such as for example in a kettle or glass, to produce the beverage or broth of interest. In the case of cups, mugs, bowls, flasks, kettles, bottles or the like, preferably (only) the inner side of the cups, mugs, bowls, flasks, kettles, bottles or the like are impregnated with the plant extract of interest. By pouring cold or hot liquid (such as water) into the cups, mugs, bowls, flasks, kettles, bottles or the like, immersion and infusion take place to provide the beverage or broth of interest. In one embodiment of the invention, the cups, mugs, bowls, flasks, kettles, bottles or the like are entirely made of the products of the invention, i.e. made of the composition of the invention comprising a layer of fibrous plant product and a plant extract applied thereto. In this case, the cups, mugs, bowls, flasks, kettles, bottles or the like are preferably disposable. Thus, the customer would simply need cold or hot liquid, such as cold or hot water, to make the infusion, beverage or broth of interest. In an alternative embodiment, the products of the invention, i.e. the compositions of the invention comprising a layer of fibrous plant product and a plant extract applied thereto, form the inner coating or lining of cups, mugs, bowls, flasks, kettles, bottles or the like. These products may be provided either as disposable, such as (bio-)degradable, or as non-disposable products, depending on the material used for producing the cups, mugs, bowls, flasks, kettles, bottles or the like. Also, the inner coating or lining of cups, mugs, bowls, flasks, kettles, bottles or the like may either be in the form of a permanent coating or lining, i.e. fixed to the inner walls of said cups, mugs, bowls, flasks, kettles, bottles or the like, or it may be in the form of a replaceable product (like a cartridge) having the same shape as the cup, mug, bowl, flask, kettle, bottle or the like, in order to be disposed of after use (i.e. after preparing the infusion, beverage or broth) and replaced by a new product in order to prepare a new infusion, beverage or broth.

In one embodiment of the invention, the products are provided in the form of kits comprising said sheets, leafs (or leaf-like shapes), sticks, bands, cups, mugs, bowls, flasks, kettles, bottles or the like, straws or tubes, discs or sheets and the like. In one embodiment, the kits may also comprise extracts of plants of interest, suitable for the customer to impregnate said products before making the desired beverage or broth (i.e., first-time impregnation), or to re-impregnate said products after use to make further beverages or broths (i.e., reusable version of a product that was already pre-impregnated before its first use). In one embodiment of said kits, the kits comprise various types of plants of interest, i.e. various different fruits, herbs, medicinal plants, tea, vegetables and/or spices, in order to enable the customer to make his/her own blends as desired. In this way, the customer is able to create his/her flavor or taste. In these kits, the different types of plants may be in the form of different sheets, leafs (or leaf-like shapes), sticks, bands, cups, mugs, bowls, flasks, kettles, bottles or the like, straws or tubes, discs or sheets and the like, separately pre-impregnated with said different fruits, herbs, medicinal plants, tea, vegetables and/or spices. Alternatively, the different fruits, herbs, medicinal plants, tea, vegetables and/or spices may be provided in the kits in the form of separate plant extracts (or pre-mixed combinations), in order to be used for re-impregnation as described above.

In one embodiment, where the products of the invention are provided in the form of sheets like sheets of paper, impregnated with the plant extracts of interest as described above, the sheets may form separate pages and be put together like pages of a book. For example one or more page of said book may be impregnated with one type of plant (fruit, herb, medicinal plant, tea, vegetable and/or spice), whereas other pages are impregnated with different types of plants (fruit, herb, medicinal plant, tea, vegetable and/or spice). The pages that are impregnated with a certain plant extract, wherein the extract comprises the extract of either a single plant or a blend of plants, may contain a description of said plant(s) used for the impregnation of said page. The description may be written on or printed to said page using food inks or food dyes. In a preferred embodiment of the "book" described above, the book is a "tea book", where the impregnations on the individual pages are extracts of different types of tea, wherein separate pages correspond to separate types of tea or blends of tea containing said description of the original tea product used for making the sheets and/or the impregnations. The sheets or pages of the book are suitable for the customer to be used for preparing infusions, beverages or broths. In one embodiment, the pages of the book may be perforated for easy detaching the pages from the book.

In the case of teas or other compositions for use in making beverages, the consumer does not need to use a conventional filter paper (tea bag) for preparing the infusion. Specifically, no other accessory is required (instead of water and a cup or a glass) for making the infusion.

In one embodiment, the composition offers a high level of biodegradability, for example by allowing the composting of tea bags.

In sum, the reconstituted plant products of the invention provide several benefits and advantages, such as
- the provision of products with higher infusion yield and infusion speed (both with boiling water and water at room temperature);
- the provision of a new format to infuse beverages without the need of packages and accessories;
- the provision of a preferably dispersible and biodegradable product;
- the ability to adjust the content of active ingredients (such as polyphenols, essential oils and the like) to provide a consistent composition;
- the ability to adjust (reduce) the content of undesired constituents (such as pesticides, caffeine, nicotine, aluminum, heavy metals, and the like);
- the ability to provide new sensory characteristics (such as adjusting intensity of flavor, mixture of various plants and the like); and
- reduction of the bacterial load during the manufacturing process.

The following examples further describe and demonstrate embodiments that are within the scope of the present invention. The examples are given solely for the purpose of illustration, and are not to be construed as limitations of the present invention since many variations thereof are possible without departing from its spirit and scope.

EXAMPLES

Example 1

A tea product was made according to the following method: A black tea was initially heated at 85° C. for 20 minutes with a tea/water ratio of 1 to 5 by weight. This was followed by an extraction step in a hydraulic press to separate the aqueous portion from the tea fiber portion. The recovered tea fiber portion was again heated at 85° C. for 10 minutes with a tea/water ratio of 1 to 5 by weight. After an additional extraction (by pressing), the samples were then refined in a Valley beater at 1.4% consistency for 10 minutes. After refining, cellulosic fibers (a blend of abaca, hardwood and softwood pulps, with the respective ratios: 60/10/30) were added to the tea fibrous residue with a tea fiber/woodpulp ratio of 5 to 1 in weight in order to make hand sheets. The aqueous portion was concentrated in an evaporator to a solid concentration of 50% and then coated on a hand sheet on a manual size-press. The soluble level is typically between 27 and 37% in dry finished product. In example 1, soluble level of the reconstituted tea was approx. 27%, which is the soluble content of conventional tea used as the starting material of the experiment. The coated hand sheets were dried on a plate dryer.

The product obtained in this example (reconstituted tea; "B20" sample in the form of discs, containing a coating made by impregnation with tea extract) was tested for its properties in preparing tea and compared to a conventional tea product in tea bags. Both products were used to make tea, and the optical density of the solution (tea) was measured at 274 nm. For both samples, the total infusion time in hot water (90° C.) was 2.5 minutes which usually corresponds to consumer habit. Same weights of tea material and identical experimental conditions were used: a beaker containing 200 ml water (ref. Cristaline) was heated at 90° C. At T=0, ie. upon start of the experiment, heating was stopped and the tea bag was immersed into water. A rotary magnet was used to homogenize the content of the beaker during the entire experiment.

Samples of water were taken regularly, every 30 seconds and up to 3 minutes. Then, the optical density of the sample was determined using a spectrophotometer at the wavelength of 274 nm (maximum absorption of caffeine). The reference/blank test was run with a sample of clear water (Cristaline) heated at 90° C.

The optical densities measured (after 3 minutes of infusion) for the reconstituted tea product were 0.69, whereas for the conventional tea bag 0.63 was measured. The result is graphically shown in FIG. 1. Thus, for reconstituted tea (B20), a higher infusion rate of solubles was obtained as with the conventional product in tea bags. The extraction ratio in this test was +10% as compared to the conventional product in tea bags. The reconstituted tea enabled a more efficient infusion (100% solubles are extracted from the plant); using the same amount of material, more solubles could be released from reconstituted tea than from natural tea.

Similar results were obtained with different infusion times, or when reconstituted tea was compared to tea in loose form. Also, similar results were obtained with reconstituted products made from herbs as compared to conventional herbal tea products.

Example 2

The product of example 1 (B20) was used to determine the infusion rate as compared to conventional tea in tea bags.

Figure 2:
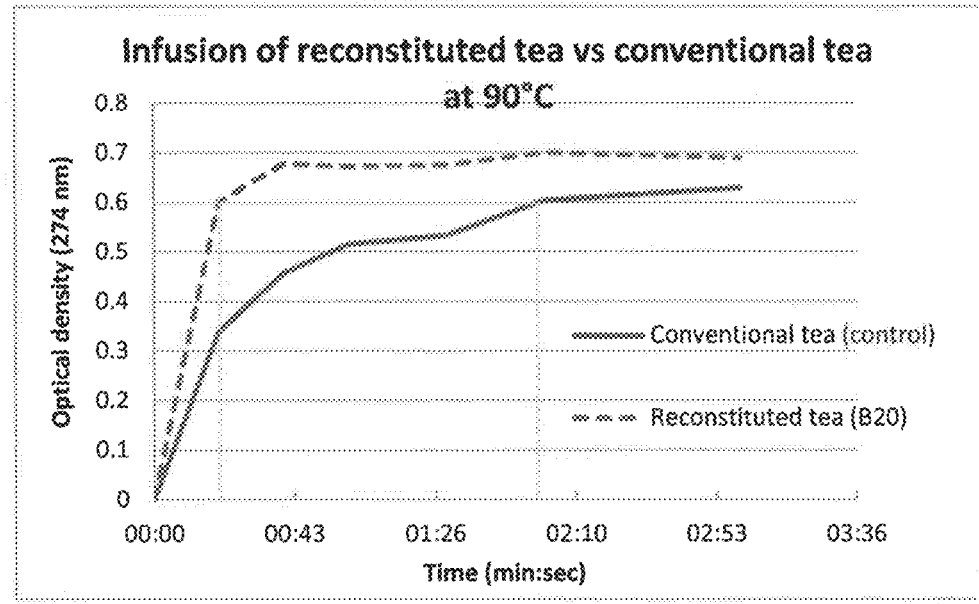
FIG. 2 is a graph showing total infusion time in hot water (90° C.) for an impregnated tea product (fiber-web made of non soluble tea particles impregnated with soluble tea portion) as compared to a conventional tea in the form of a tea bag.

The optical densities were measured over time. The experimental set-up was identical to example 1. For the reconstituted tea product, an optical density of 0.6 was reached within 20 seconds from contacting the same with water, whereas about 2 minutes were required to obtain the same optical density using the conventional tea bag. The result is graphically shown in FIG. 2.

The example demonstrates that the reconstituted tea product provides faster infusion than conventional tea in tea bags.

Similar results were obtained when reconstituted tea was compared to tea in loose form. Also, similar results were obtained with reconstituted products made from herbs as compared to conventional herbal tea products.

Example 3

Figure 3:
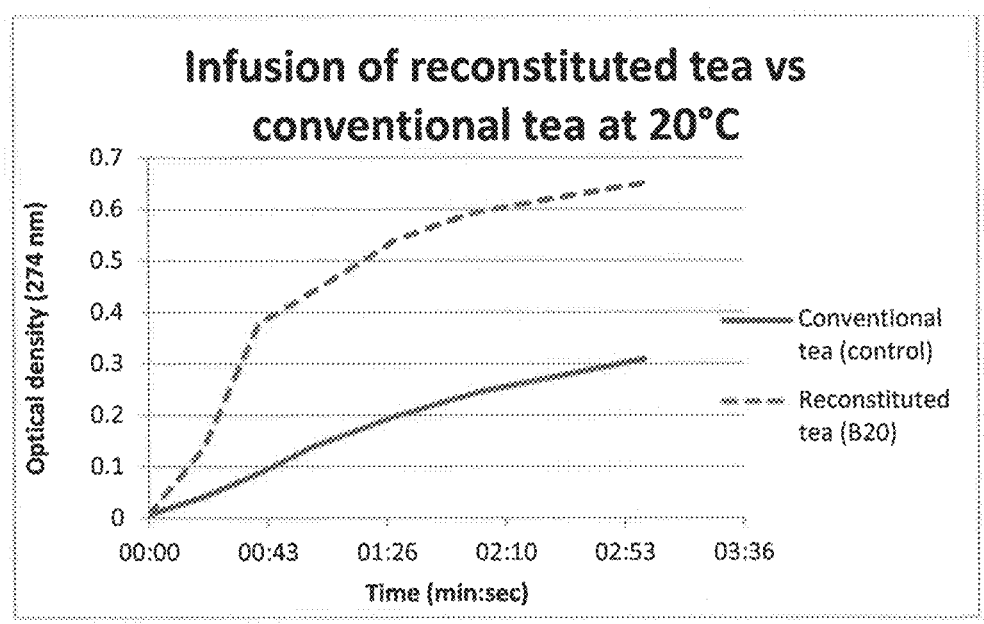
FIG. 3 is a graph showing total infusion time in cold water (20° C.) for an impregnated tea product (fiber-web made of non soluble tea particles impregnated with soluble tea portion) as compared to a conventional tea in the form of a tea bag.

The product of example 1 (B20) was used to determine its infusion properties at different temperatures as compared to conventional tea in tea bags As in example 2, the optical densities were measured over time. The experimental set-up was identical to example 2, except for the fact that water at room temperature (20° C.) was used instead of hot water (90° C.). For the reconstituted tea product, an optical density of 0.3 was reached within about 30 seconds (0.6 within about 2 minutes) from contacting the same with water, whereas the conventional tea bag required about 6 times longer to provide the optical density of 0.3. The result is graphically shown in FIG. 3.

The example demonstrates that even in cold water the reconstituted tea product provides faster infusion than conventional tea in tea bags. At 20° C., the extraction ratio after 3 minutes of infusion is much better than standard product (+100%). Also, the extraction ratio of the reconstituted tea material at 20° C. is similar to the extraction ratio at 90° C.

Similar results were obtained when reconstituted tea was compared to tea in loose form. Also, similar results were obtained with reconstituted products made from herbs as compared to conventional herbal tea products.

Example 4

The following example demonstrates that the delivery of solubles and active ingredients can be easily adjusted in the manufacturing process (either decreased or increased as compared to a given standard).

As control, a conventional tea was used containing solubles in an amount of 26% (w/w). The soluble content was measured by determining the weight of a given sample before and after extraction. In a separate experiment, a portion of the same tea was subjected to a manufacturing process similar to example 1. The amount of solubles was adjusted in three different runs to 5% (w/w; decreased level), to 26% (w/w; standard level) and to 50% (w/w; increased level) by adjusted the coating ratio during impregnation.

The experiment demonstrates that the reconstituted product can be used to provide a consistent, standardized delivery level of soluble/active ingredients as compared to the natural products that generally show an inherent variability.

Example 5

Following the method disclosed for the product of example 1 (B20), similar products were obtained and tested. In these tests, different reconstituted tea products, i.e. reconstituted material constituted by the base web impregnated with the solubles portion of the original material, were produced and compared to conventional tea, either in loose form or in the form of tea bags. The reconstituted tea products varied in the solubles coating ratio, i.e. the amount of solubles coated onto the base web of reconstituted tea (dry basis weight of reconstituted plant material in g/m$^2$).

The following products were prepared and tested:

| Sample # | Description | Format | Dry basis weight | Amount of solubles (=coating ratio for reconstituted samples) |
| --- | --- | --- | --- | --- |
| 1 | Original vegetal, unwrapped | Loose | na | Around 30% |
| 2 | The same vegetal as above but in tea bag (same plant and same origin as 1) | Tea bag (double chamber) | na | Around 30% |
| 3 | Standard reconstituted vegetal (same plant and same origin as 1 & 2) ie new delivery device | disks | Standard (100 gsm) | Same as original vegetal (30%) |
| 4 | Adjusted reconstituted vegetal (same plant and same origin as 1 & 2) | disks | standard | Decreased vs standard (20%) |
| 5 | Adjusted reconstituted vegetal (same plant and same origin as 1 & 2) | disks | standard | increased vs standard (50%) |
| 6 | Adjusted reconstituted vegetal (same plant and same origin as 1 & 2) | disks | Decreased vs standard (60 gsm) | Same as original vegetal (30%) |

Specifically, sample #3 was compared with samples #1 and #2; sample #3 was compared with samples #4 and #5; and sample #3 was compared with sample #6.

The comparison of the properties of the products similar to the experiments performed in examples 1 to 4 confirm the results in examples 1 to 4, namely that reconstituted tea provides a better ratio of extraction and faster extraction, even at low temperature (water at room temperature) and allows to adjust the amount of solubles/active ingredients released upon infusion.

Example 6

Tea bags were made from tea material, which was mixed in various batches with a blend of cellulose fibers (abaca, hardwood and softwood pulps, with the respective ratios: 60/10/30). As in example 1: a black tea was initially heated at 85° C. for 20 minutes with a tea/water ratio of 1 to 5 by weight. This was followed by an extraction step in a hydraulic press to separate the aqueous portion from the tea fiber portion. The recovered tea fiber portion was again heated at 85° C. for 10 minutes with a tea/water ratio of 1 to 5 by weight. After an additional extraction (by pressing), the samples were then refined in a Valley beater at 1.4% consistency for 10 minutes. After refining, cellulosic fibers (a blend of abaca, hardwood and softwood pulps, with the respective ratios: 60/10/30) were added to the tea fibrous residue at various levels in order to prepare the different samples and make hand sheets. Hand sheets were later dried on a plate dryer.

It is possible to make tea bags from a fiber web produced with an adjustable proportion of tea fibers or herb fibers (from 5% to 80% of the total weight), mixed with cellulosic and/or synthetic fibers. The proportion of tea or herb fibers can be distinctively high.

During the first trial, the ratio of tea/cellulosic fibers was 40/60 (w/w); in a second trial the ratio was 60/40 (w/w) and in a third trial, the ratio was 80/20 (w/w). The fibrous web used for making the tea bags was not impregnated but the tea bags were filled with tea (taken from conventional tea bags). Their infusion performance was compared to conventional tea bags containing the same amount of tea. The measurements were similar to examples 1 and 2.

Figure 4:
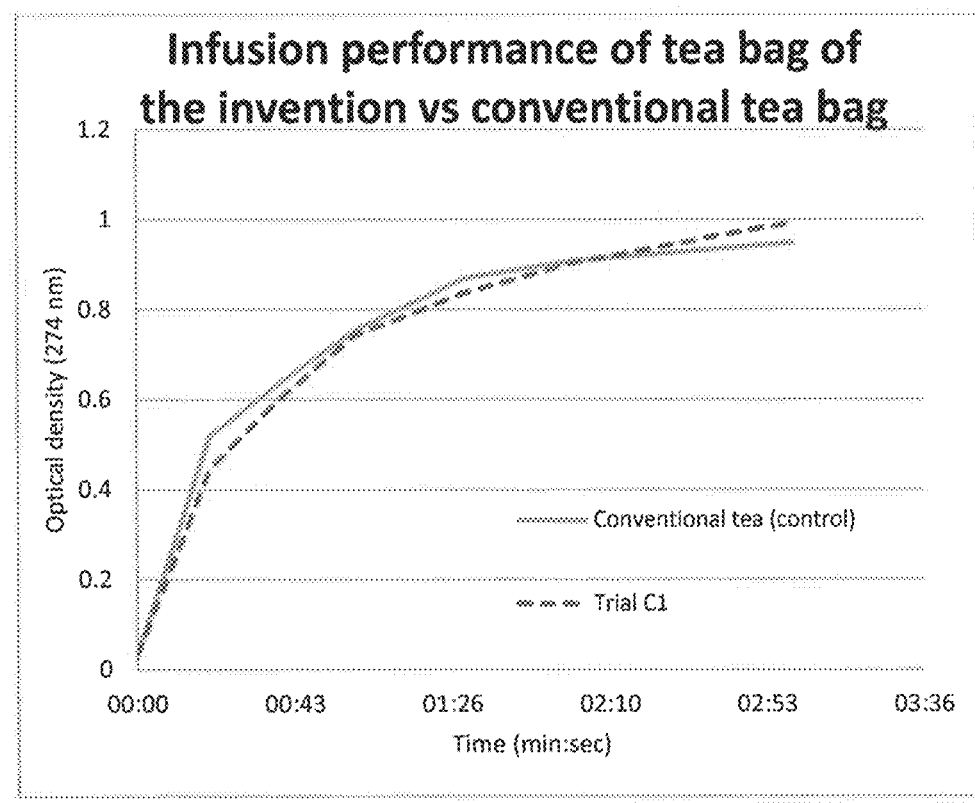
FIG. 4 is a graph showing infusion performance of a tea bag of the invention filled with conventional tea as compared to the infusion performance of a standard cellulosic tea bag filled with conventional tea.

The infusion performance of the sample corresponding to the 80/20 ratio (Trial C1) matched with the infusion performance of conventional cellulosic tea bags (control) as measured by optical density. The result is graphically shown in FIG. 4.

Example 7

In another trial, the fiber web used for making the tea bags of example 7 was impregnated with tea extract obtained in the extraction step coming from starting material. The tea bags were additionally filled with tea. The amounts of coating varied from 5% to 50% of the total weight.

In separate tests, fiber webs were made from tea (*Camellia sinensis*) or herbs used for producing herbal teas.

Infusion performance was measured and compared to conventional tea bags/herbal tea bags containing the same amount of tea/herbal tea. The measurements were similar to examples 1 and 2.

Again, more solubles were released, and infusion rates were faster for the reconstituted, impregnated tea bags than for the conventional tea bags due to the additional release of tea soluble from the coating, in addition to natural infusion coming from the tea which is contained in the bag. The additional delivery of solubles provides a distinctive stronger taste.

In one trial, an tea bag was made from tea, impregnated with tea extract as described above in this example. In infusion tests using water at 90° C., the product released 35% (w/w) tea solubles into the water.

Example 8

In one experiment, two different products were produced: product C1 in the form of a tea bag, containing about 5% solubles (w/w), with a dry basis weight of approx. 120 g/m² (w/w) and product B20 in the form of a tea bag, containing about 5% solubles (w/w), with a dry basis weight of approx. 60 g/m² (w/w). The tea bags were not filled with tea.

Figure 5:
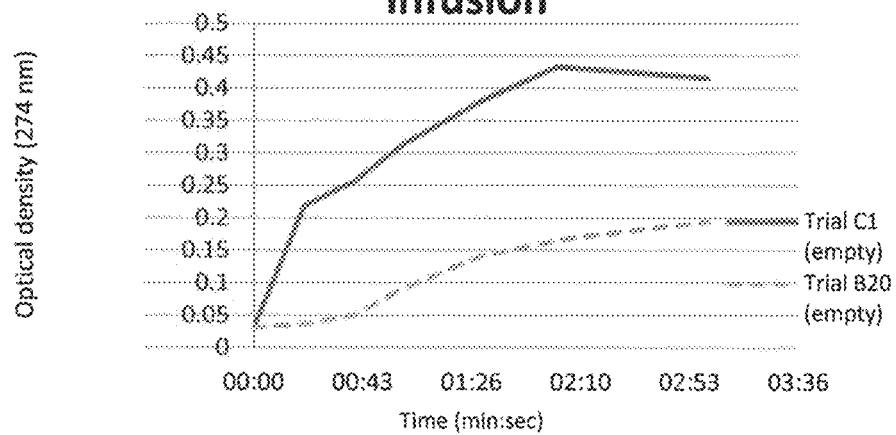
FIG. 5 is a graph showing infusion performance of a tea bag of the invention at a basis weight of 120 g/m² as compared to the infusion performance of a tea bag of the invention at a basis weight of 60 g/m². None of them have been filled with conventional tea.

Infusion performance under identical conditions was measured and compared for samples C1 and B20 similar to examples 1 and 2. The results which are graphically shown in FIG. 5 demonstrate that the release of tea solubles can be also driven by the basis weight of the finished product.

Example 9

Example 1 described above was repeated with the additional use of a wet strength agent (here: cationic polyamide amine resin), in order to reduce potential degradation of some of the reconstituted material in water. The wet strength agent was added to the fibrous portion.

A tea product was made according to the following method: A black tea was initially heated at 85° C. for 20 minutes with a tea/water ratio of 1 to 5 by weight. This was followed by an extraction step in a hydraulic press to separate the aqueous portion from the tea fiber portion. The recovered tea fiber portion was again heated at 85° C. for 10 minutes with a tea/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the tea fibrous residue with a tea fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. The soluble level is typically between 27 and 37% in dry finished product. In this example, soluble level of the reconstituted tea was approx. 27%, which is the soluble content of conventional tea used as the starting material of the experiment. The coated hand sheets were dried on a plate dryer.

Infusion trials were run in hot water (approx. 90° C.) and product with wet strength agent showed less degradability into water than same material without agent.

Figure 6:
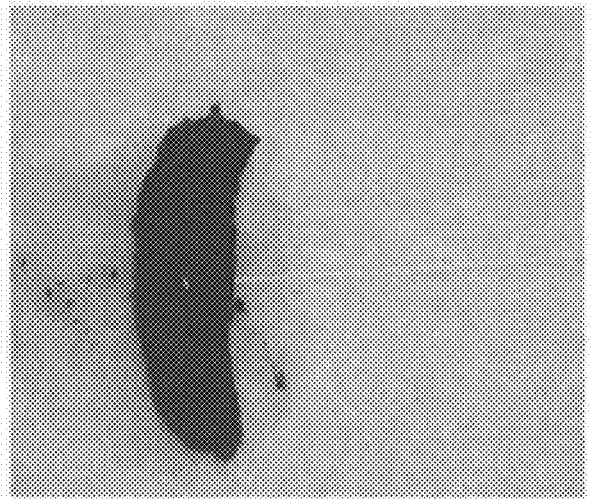
FIG. 6 shows reconstituted tea in one example without the use of a wet strength agent after 3 mins of infusion. The photograph shows that material is degraded.

FIG. 6 shows reconstituted tea in one example without the use of a wet strength agent after 3 mins of infusion. The photograph shows that material is degraded.

Figure 7:
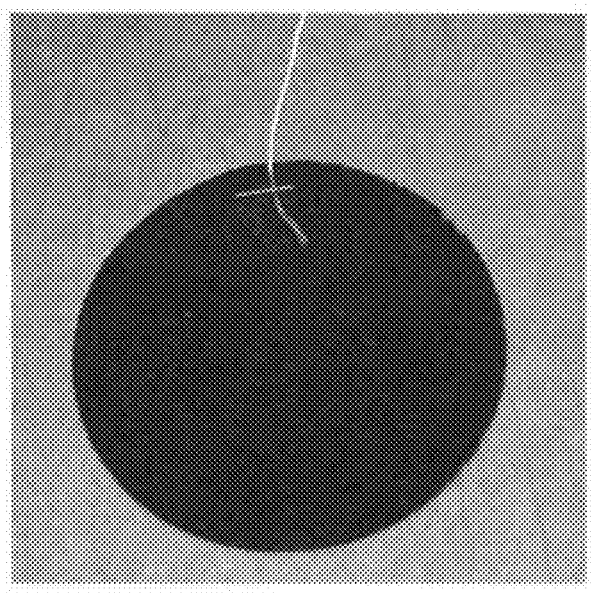
FIG. 7 shows reconstituted tea in this example with the use of a wet strength agent after 3 mins of infusion. The photograph shows that the material is substantially undegraded.

FIG. 7 shows reconstituted tea in this example with the use of a wet strength agent after 3 mins of infusion. The photograph shows that the material is substantially undegraded.

Example 10

In order to determine the effect of reconstituted tea soluble content and the dry basis weights on the infusion profile, a tea product was made according to the following method: A black tea was initially heated at 85° C. for 20 minutes with a tea/water ratio of 1 to 5 by weight. This was followed by an extraction step in a hydraulic press to separate the aqueous portion from the tea fiber portion. The recovered tea fiber portion was again heated at 85° C. for 10 minutes with a tea/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the tea fibrous residue with a tea fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. The soluble level is typically between 27 and 37% in dry finished product. In this example, the following products were prepared:

Product A: soluble level of the reconstituted tea was 22%, which is the soluble content of conventional tea used as the starting material of the experiment. Dry basis weight of the material was 70 grs per m² (dry basis);

Product C: soluble level of the reconstituted tea was 22%, which is the soluble content of conventional tea used as the starting material of the experiment. Dry basis weight of this material was 170 grs per m² (dry basis) which is 143% higher than A;

Product D: soluble level of the reconstituted tea was 38% which is 73% higher than A. Dry basis weight of D material was 170 grs per m² (dry basis) also The coated hand sheets were dried on a plate dryer.

The products (A, C and D) obtained in this example were tested for their properties in preparing tea and compared. Both products were used to make tea, and the optical density of the solution (tea) was measured at 274 nm. For all samples, the total infusion time in hot water (90° C.) was 5 minutes. Same weights of tea material (2.5 grs) and identical experimental conditions were used: a beaker containing 500 ml water was heated at 90° C. At T=0, ie. upon start of the experiment, heating was stopped and a tea strip was immersed into water. A rotary magnet was used to homogenize the content of the beaker during the entire experiment.

Samples of water were taken regularly and up to 5 minutes. Then, the optical density of the sample was determined using a spectrophotometer at the wavelength of 274 nm (maximum absorption of caffeine). The reference/blank test was run with a sample of clear water heated at 90° C.

Figure 8:
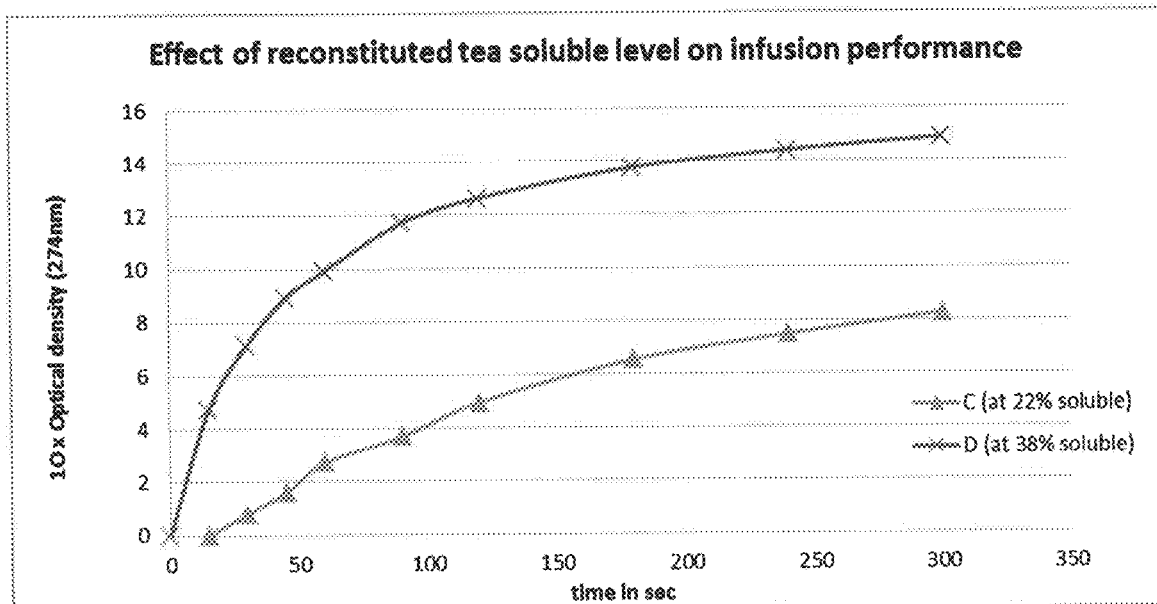
FIG. 8 shows a reconstituted material produced according to Example 10. Reconstituted tea (D—high soluble content) shows a higher infusion level of tea solubles than C (standard soluble level).
Figure 9:
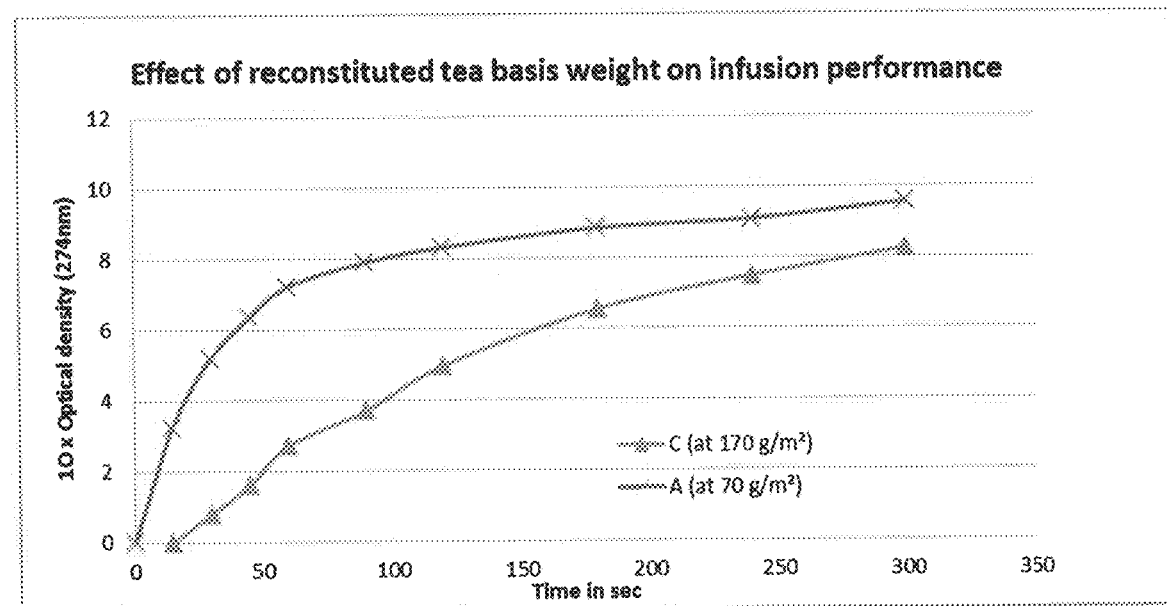
FIG. 9 shows a reconstituted material produced according to Example 10. Reconstituted tea A with a lower basis weight shows a faster infusion level of tea solubles than C.

The result is graphically shown in FIGS. 8 and 9.

FIG. 8: Reconstituted tea (D—high soluble content) shows a higher infusion level of tea solubles than C (standard soluble level). In order to reach an infusion level of 8.3 (expressed by 10× optical density at 274 nm), it takes 300 sec with sample C whereas only 40 sec are needed for D material (87% faster). Sensory evaluation performed by tea panel group also showed a stronger tea flavor and taste with D than with C after 5 mins infusion. This demonstrates that tea infusion taste can be adjusted thanks to soluble content of reconstituted tea material.

FIG. 9 shows that Reconstituted tea A with a lower basis weight shows a faster infusion level of tea solubles than C. Figures show that infusion rate of 8.3 (expressed by 10× optical density at 274 nm) is reached in 120 sec for A sample whereas 300 sec are needed for C. Infusion with A is 60% faster than with C. Actually, a lower basis weight for a given weight of material entails a more important contact surface which, at the end, improves infusion kinetics.

Example 11

In order to determine the effect of the reconstitution process on the green tea infusion sensory profile, a tea product was made according to the following method: a green tea (Sencha from China) was initially heated at 85° C. for 20 minutes with a tea/water ratio of 1 to 5 by weight. This was followed by an extraction step in a hydraulic press to separate the aqueous portion from the tea fiber portion. The recovered tea fiber portion was again heated at 85° C. for 10 minutes with a tea/water ratio of 1 to 5 by weight. After an additional extraction (by pressing), the fibrous portion was then refined in a Valley beater at 1.4% consistency for 10 minutes.

After refining, cellulosic fibers (a blend of abaca, hardwood and softwood pulps, with the respective ratios: 60/10/30) were added to the tea fibrous residue with a tea fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. In this example, the product was produced at 36% extract content, which is the soluble content of the starting material of the experiment. The coated hand sheets were dried on a plate dryer.

Figure 10:
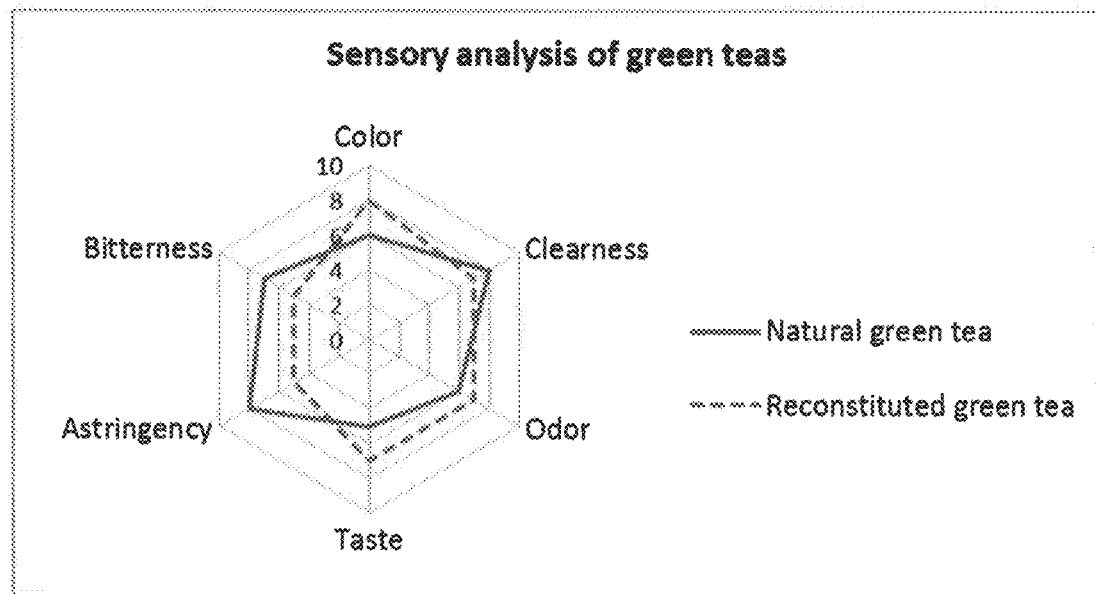
FIG. 10 shows the sensorial profile of reconstituted green tea and natural material.

The product obtained in this example was tested for its sensory properties and compared to natural tea material used for the experiment as described above. Both products were used to make tea. For all samples, the total infusion time in hot water (90° C.) was 5 minutes. Same weights of tea material (2 grs) and identical experimental conditions were used: a beaker containing 200 ml water was heated at 90° C. and tea materials were immersed into water. Then, after 5 minutes, sensory profile of both products was performed. The result is graphically shown in FIG. 10.

The experiment shows that the odor, color and taste are higher in the reconstituted tea than in the natural material. However, astringency and bitterness are significantly lower in the reconstituted tea than natural material.

Example 12

Reconstitution of Rooibos Leaves

A reconstituted product was made according to the following method: Rooibos (*Aspalathus linearis*) was initially heated at 85° C. for 20 minutes with a rooibos/water ratio of 1 to 5 by weight. This was followed by an extraction step in a hydraulic press to separate the aqueous portion from the rooibos fiber portion. The recovered rooibos fiber portion was again heated at 85° C. for 10 minutes with a rooibos/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the rooibos fibrous residue with a rooibos fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. In this example, the product was produced at 22% extract content, which is the soluble content of the starting material of the experiment. The coated hand sheets were dried on a plate dryer.

Figure 11:
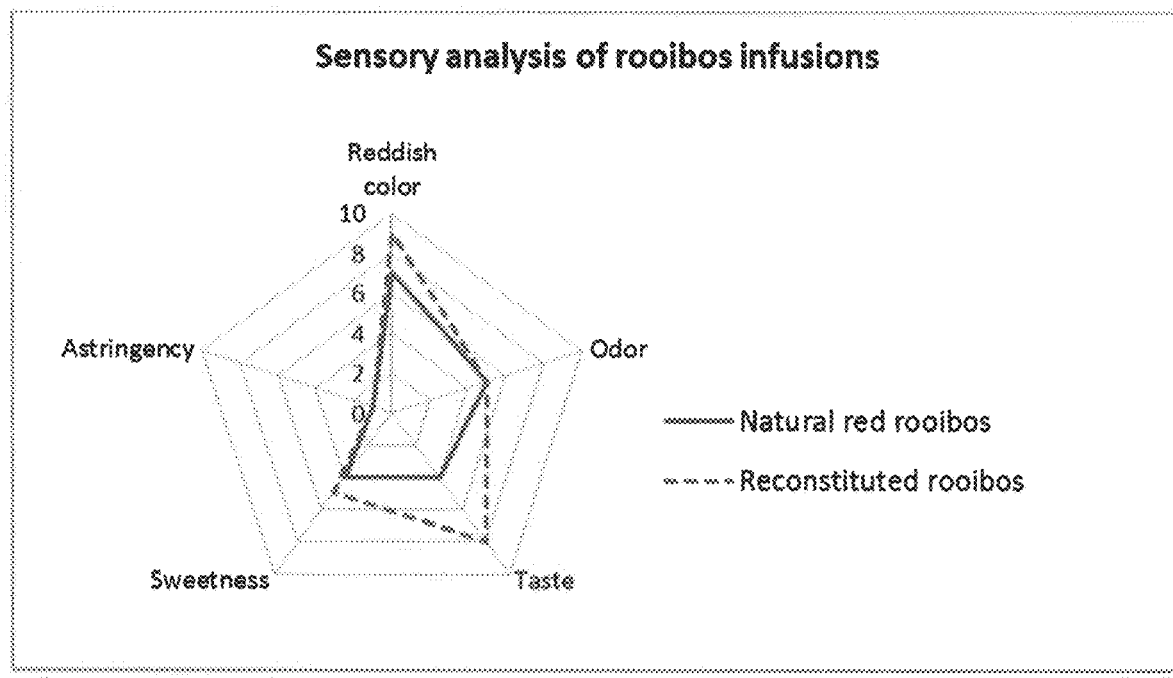
FIG. 11 shows the sensory analysis of reconstituted rooibos and reconstituted material (rooibos leaves).

The product obtained in this example was tested for its sensory properties and compared to natural rooibos material used for the experiment as described above. Both products were used to make a rooibos beverage. For all samples, the total infusion time in hot water (90° C.) was 5 minutes. Same weights of rooibos material (2 grs) and identical experimental conditions were used: a beaker containing 200 ml water was heated at 90° C. and rooibos materials were immersed into water. Then, after 5 minutes, sensory profile of both products was performed. The result is graphically shown in FIG. 11.

The experiment demonstrates that reconstituted rooibos tea shows a stronger taste than original material. Moreover, color is stronger.

The reconstituted rooibos obtained in this example and its original material were tested for their properties in preparing infusion and compared. Both products were used to make infusion, and the optical density of the solution was measured at 450 nm. For all samples, the total infusion time in hot water (90° C.) was 5 minutes. Same weights of materials (2.5 grs) and identical experimental conditions were used: a beaker containing 500 ml water was heated at 90° C. At T=0, ie. upon start of the experiment, heating was stopped and a reconstituted rooibos strip was immersed into water. A rotary magnet was used to homogenize the content of the beaker during the entire experiment.

Samples of water were taken regularly and up to 5 minutes. Then, the optical density of the sample was determined using a spectrophotometer at the wavelength of 450 nm (maximum absorption of lutein). The reference/blank test was run with a sample of clear water heated at 90° C.

Figure 12:
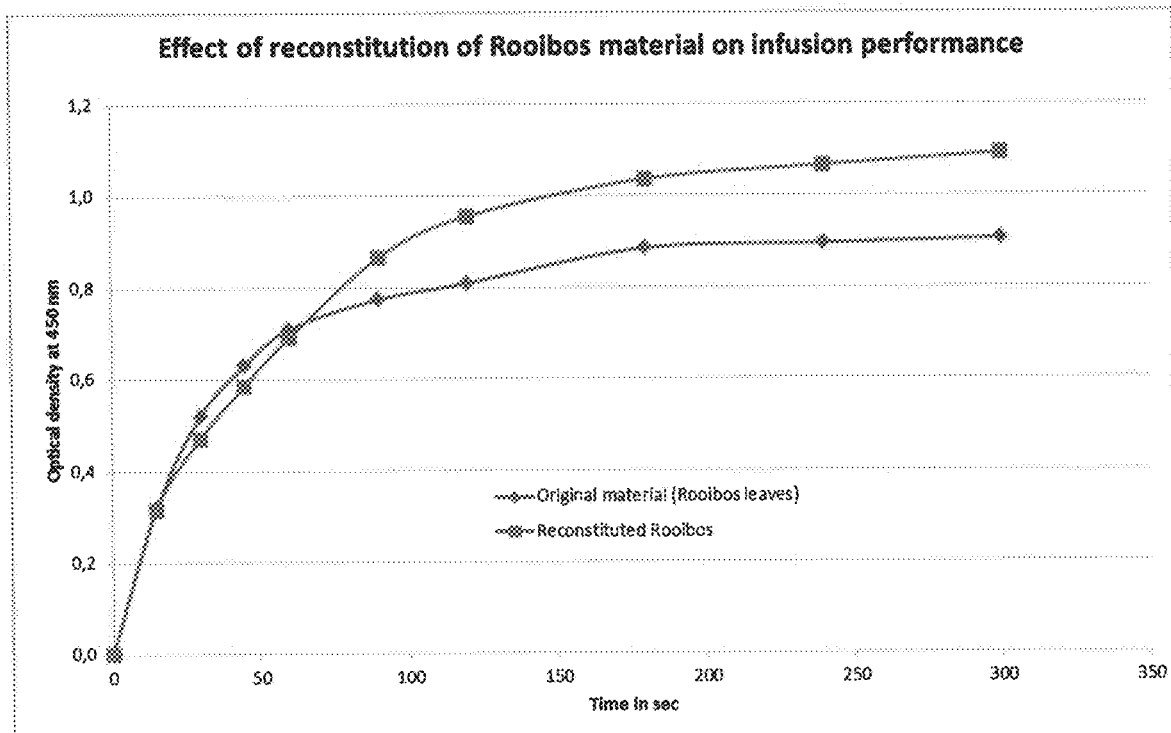
FIG. 12 shows the infusion performance of a reconstituted Rooibos material.

The infusion performance for reconstituted Rooibos material is graphically shown in FIG. 12. Infusions of rooibos products are comparable. However, it is demonstrated that reconstituted rooibos offers a more complete extraction. After 5 mins infusion, optical density of liquor made of reconstituted rooibos is 1.1 compared 0.9 for original material (+22%).

Example 13

Reconstitution of Thyme Leaves

A reconstituted product was made according to the following method: Thyme (*Thymus vulgaris*) was initially heated at 85° C. for 20 minutes with a thyme/water ratio of 1 to 5 by weight. This was followed by an extraction step in a hydraulic press to separate the aqueous portion from the thyme fiber portion. The recovered thyme fiber portion was again heated at 85° C. for 10 minutes with a thyme/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the thyme fibrous residue with a thyme fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. In this example, the product was produced at 30% extract content, which is the soluble content of the starting material of the experiment. The coated hand sheets were dried on a plate dryer.

Figure 13:
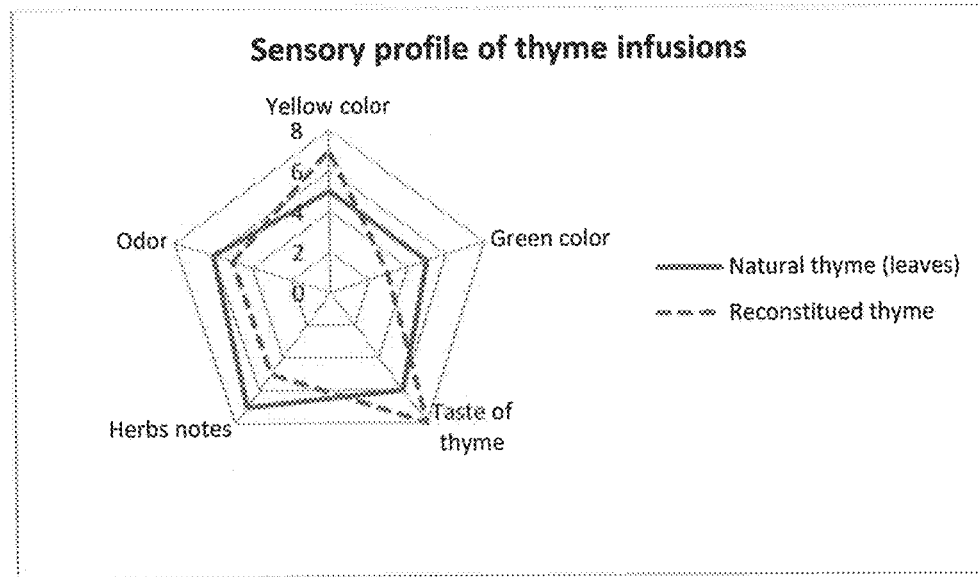
FIG. 13 shows the sensory profile of thyme leaves as compared to reconstituted thyme.

The product obtained in this example was tested for its sensory properties and compared to natural thyme material used for the experiment as described above. Both products were used to make a thyme beverage. For all samples, the total infusion time in hot water (90° C.) was 5 minutes. Same weights of thyme material (2 grs) and identical experimental conditions were used: a beaker containing 200 ml water was heated at 90° C. and thyme materials were immersed into water. Then, after 5 minutes, sensory profile of both products was performed. The result is graphically shown in FIG. 13.

The experiment shows that that the color is rather yellow for the reconstituted thyme and rather green for the natural leaves. Global odor and herbal notes are higher for the natural thyme. However, the taste of thyme is higher in the reconstituted material.

The reconstituted thyme obtained in this example and its original material were tested for their properties in preparing infusion and compared. Both products were used to make infusion, and the optical density of the solution was measured at 326 nm. For all samples, the total infusion time in hot water (90° C.) was 5 minutes. Same weights of materials (2.5 grs) and identical experimental conditions were used: a beaker containing 500 ml water was heated at 90° C. At T=0, ie. upon start of the experiment, heating was stopped and a reconstituted thyme strip was immersed into water. A rotary magnet was used to homogenize the content of the beaker during the entire experiment.

Samples of water were taken regularly and up to 5 minutes. Then, the optical density of the sample was determined using a spectrophotometer at the wavelength of 326 nm (maximum absorption of rosmarinic acid). The reference/blank test was run with a sample of clear water heated at 90° C. The result is shown in FIG. 14.

Figure 14:
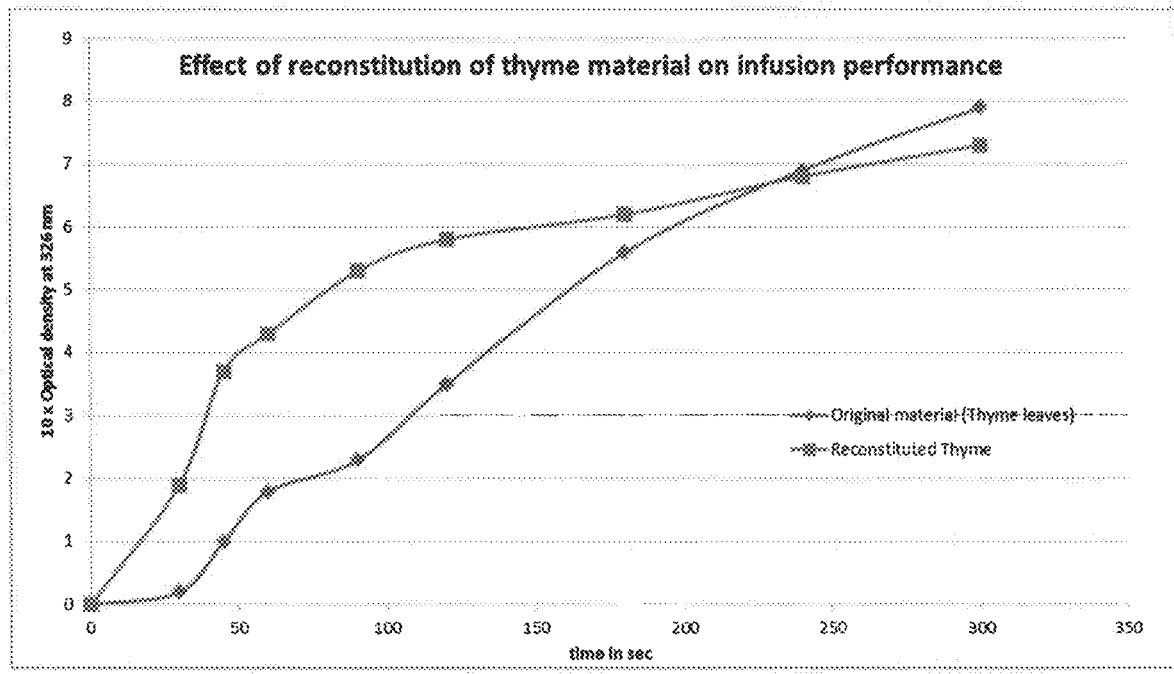
FIG. 14 shows the infusion performance of a reconstituted thyme material.

FIG. 14 shows that reconstituted thyme infusion occurs very quickly. After 90 sec infusion, optical density of original material is 2.3 whereas liquor from reconstituted thyme optical density is 5.3 which is 130% higher.

Example 14

Reconstitution of Thyme and Black Tea Leaves

A reconstituted product was made according to the following method: Thyme (*thymus vulgaris*) and black tea (*Camelia sinensis*) natural leaves were initially blended with a ratio of 50/50 and aforementioned blend was heated at 85° C. for 20 minutes with a blend/water ratio of 1 to 5 by weight. This was followed by an extraction step in a hydraulic press to separate the aqueous portion from the blend fiber portion. The recovered blend fiber portion was again heated at 85° C. for 10 minutes with a blend/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the blend fibrous residue with a blend fiber/wood pulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. In this example, the product was produced at 25% extract content, which is the balanced soluble content of the materials of the experiment. The coated hand sheets were dried on a plate dryer.

Figure 15:
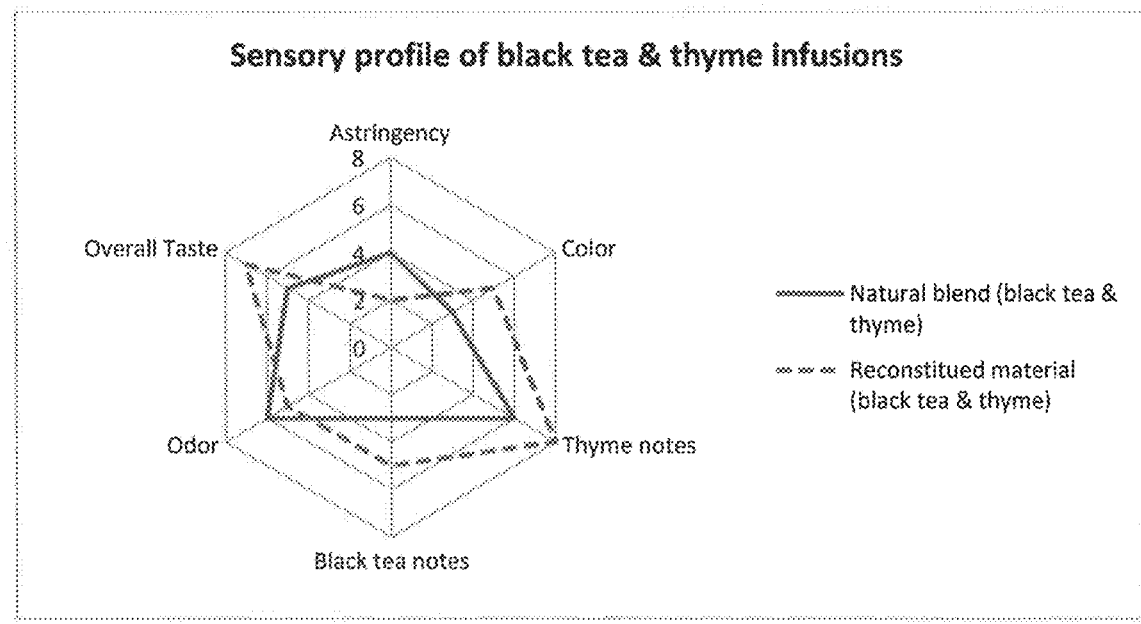
FIG. 15 shows the sensory analysis of reconstituted thyme & black tea as compared to the natural blend.

The product obtained in this example was tested for its sensory properties and compared to natural blend material used for the experiment as described above. Both products were used to make the infusion. For all samples, the total infusion time in hot water (90° C.) was 5 minutes. Same weights of material (2 grs) and identical experimental conditions were used: a beaker containing 200 ml water was heated at 90° C. and blend was immersed into water. Then, after 5 minutes, sensory profile of both products was performed. The result is graphically shown in FIG. 15.

The experiment shows that color and overall taste are higher in the reconstituted leaves. Also, thyme and black tea notes are higher. But the astringency of the product is lower in the reconstituted material.

Example 15

Reconstitution of Thyme and Laurel Leaves ("Bouquet Garni")

A reconstituted product was made according to the following method: Thyme (*Thymus vulgaris*) and Laurel (*Laurus nobilis*) natural leaves were initially blended with a ratio of 50/50 and aforementioned blend was heated at 85° C. for 20 minutes with a blend/water ratio of 1 to 5 by weight. This was followed by an extraction step in a hydraulic press to separate the aqueous portion from the blend fiber portion. The recovered blend fiber portion was again heated at 85° C. for 10 minutes with a tea/water ratio of 1 to 5 by weight.

After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the blend fibrous residue with a blend fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. In this example, the product was produced at 34% extract content which is the balanced soluble content of the materials of the experiment. The coated hand sheets were dried on a plate dryer.

Figure 16:
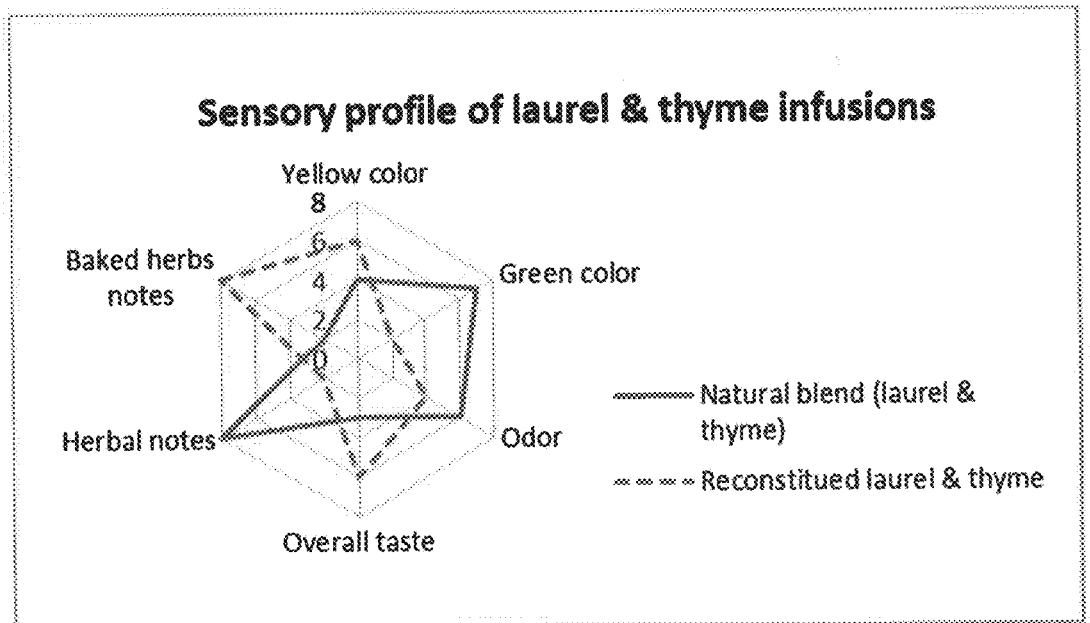
FIG. 16 shows the sensory analysis of reconstituted laurel & thyme vs natural blend (laurel & thyme leaves).

The product obtained in this example was tested for its sensory properties and compared to natural tea material used for the experiment as described above. Both products were used to make tea. For all samples, the total infusion time in hot water (90° C.) was 5 minutes. Same weights of tea material (2 grs) and identical experimental conditions were used: a beaker containing 200 ml water was heated at 90° C. and tea materials were immersed into water. Then, after 5 minutes, sensory profile of both products was performed. The result is graphically shown in FIG. 16.

The experiment shows that the two products are very different. The color is rather yellow for reconstituted product and green for the original blend. The taste is on the herbal side for the original blend and more on the baked side for the reconstituted material. Globally, taste and odor are higher for the original blend. Taste and odor can, however be adjusted and increased for the reconstituted material by increasing soluble content of reconstituted material or by adding ingredients such as food flavors, food dyes or other plant extracts having color and aroma properties.

Example 16

Reconstitution of Mint Leaves

A reconstituted product was made according to the following method: Mint (*Mentha×piperita*) was initially heated at 85° C. for 20 minutes with a mint/water ratio of 1 to 5 by weight. This was followed by an extraction step in a hydraulic press to separate the aqueous portion from the rooibos fiber portion. The recovered mint fiber portion was again heated at 85° C. for 10 minutes with a mint/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the mint fibrous residue with a mint fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. In this example, the product was produced at 50% extract content, which is the soluble content of the starting material of the experiment. The coated hand sheets were dried on a plate dryer.

Figure 17:
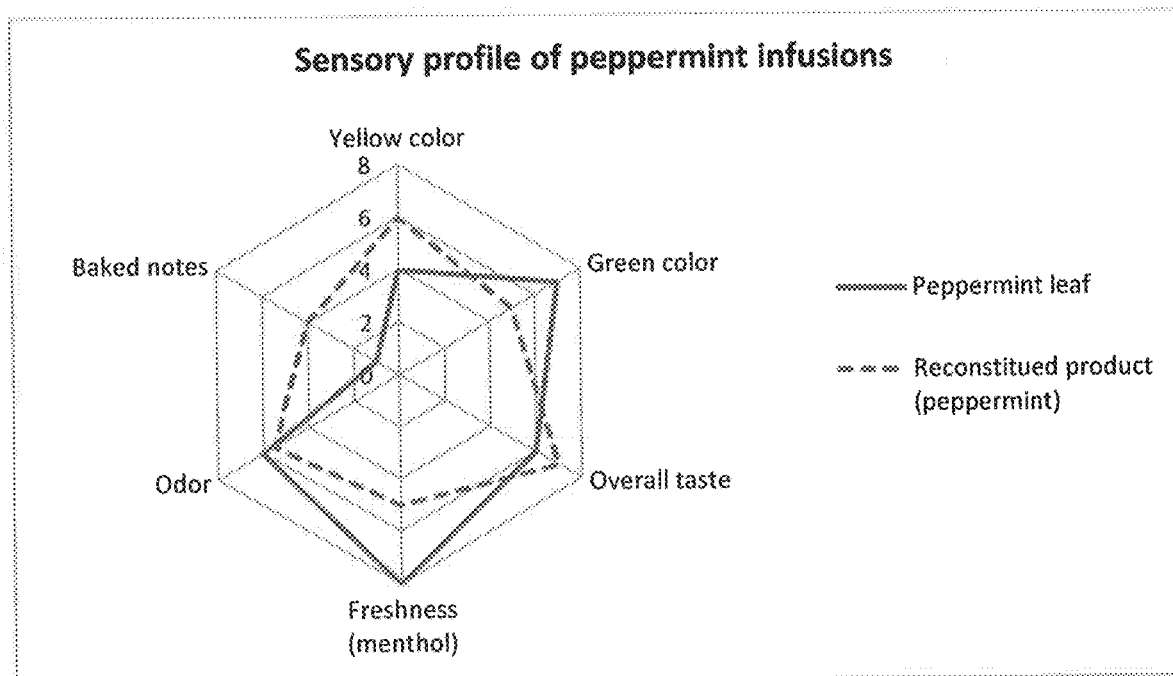
FIG. 17 shows the sensory analysis of reconstituted mint vs original mint material (*Mentha×piperita*).

The product obtained in this example was tested for its sensory properties and compared to natural mint material used for the experiment as described above. Both products were used to make a mint beverage. For all samples, the total infusion time in hot water (90° C.) was 5 minutes. Same weights of mint material (2 grs) and identical experimental conditions were used: a beaker containing 200 ml water was heated at 90° C. and mint material was immersed into water. Then, after 5 minutes, sensory profile of both products was performed. The result is graphically shown in FIG. 17.

The experiment shows that in the reconstituted product, freshness/menthol notes have been reduced vs original mint material; however, overall taste is stronger.

Example 17

Reconstitution of Mint (*Mentha×piperita*) and Green Tea Leaves (*Camellia sinensis*)

A reconstituted product was made according to the following method: Mint (*Mentha×piperita*) and Green Tea leaves (*Camellia sinensis*) natural leaves were initially blended with a ratio of 50/50 and aforementioned blend was heated at 85° C. for 20 minutes with a blend/water ratio of 1 to 5 by weight. This was followed by an extraction step in a hydraulic press to separate the aqueous portion from the blend fiber portion. The recovered blend fiber portion was again heated at 85° C. for 10 minutes with a blend/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the blend fibrous residue with a blend fiber/wood pulp ratio of 5 to 1 in weight in order to make hand sheets. The aqueous portion was concentrated in an evaporator to a solid concentration of 50% and L-menthol was added to the solution at 6% and then coated on a hand sheet on a manual size-press. In this example, the product was produced at 35% extract content, which is the balanced soluble content of the materials of the experiment. The coated hand sheets were dried on a plate dryer.

Figure 18:
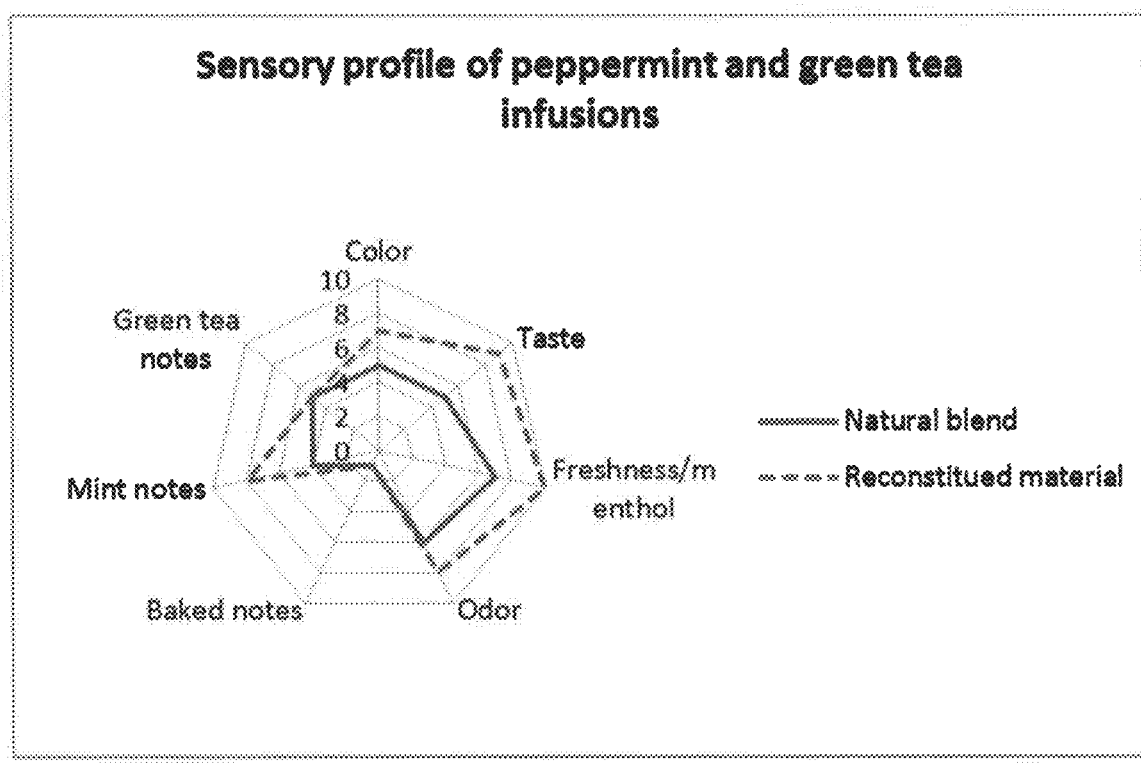
FIG. 18 shows the sensory analysis of reconstituted mint and green tea vs original blend.
Figure 19A:
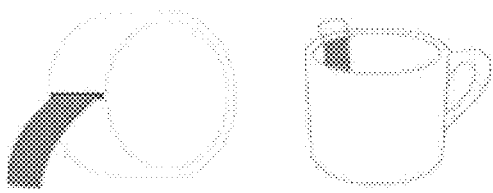
FIG. 19A-K shows reconstituted material in different physical shapes that provide for different kinds of applications.
Figure 19B:
Figure 19C:
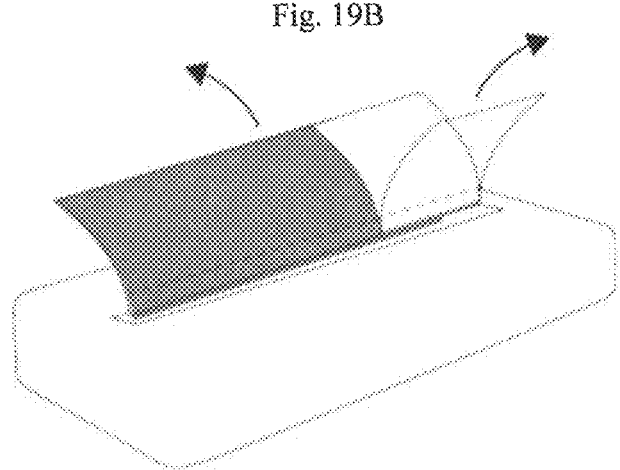
Figure 19C:
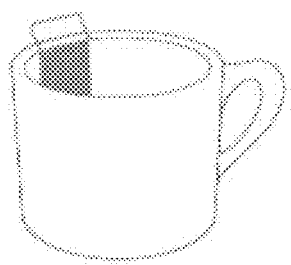
Figure 19D:
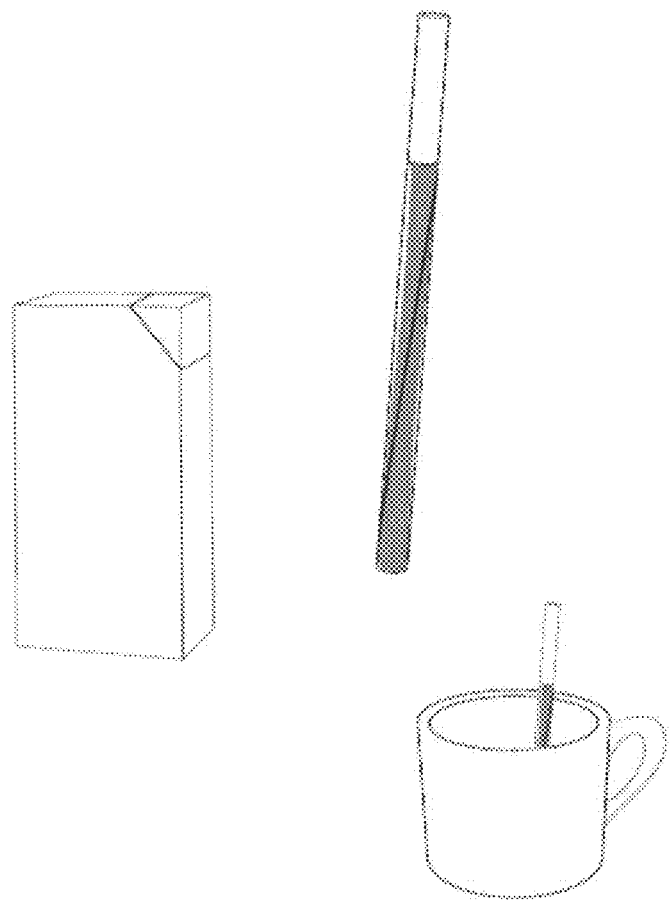
Figure 19E:
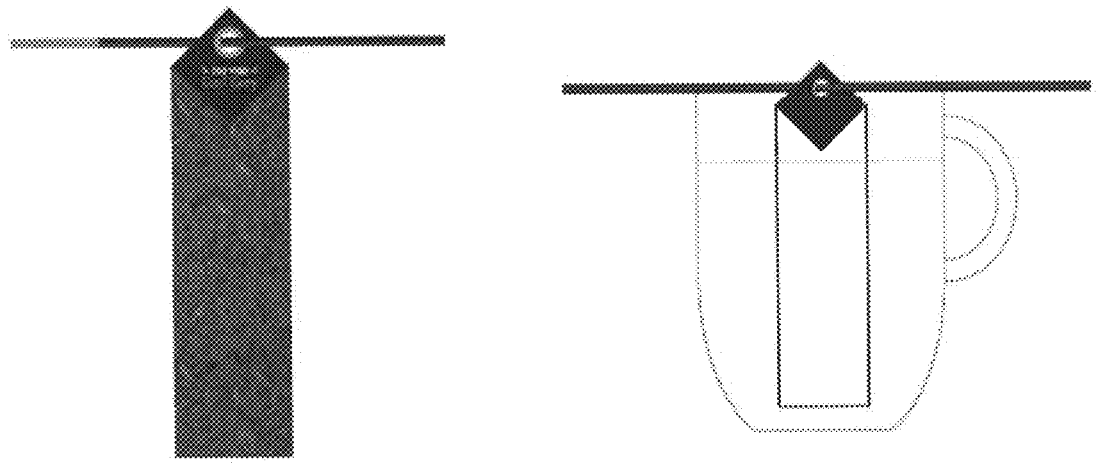
Figure 19F:
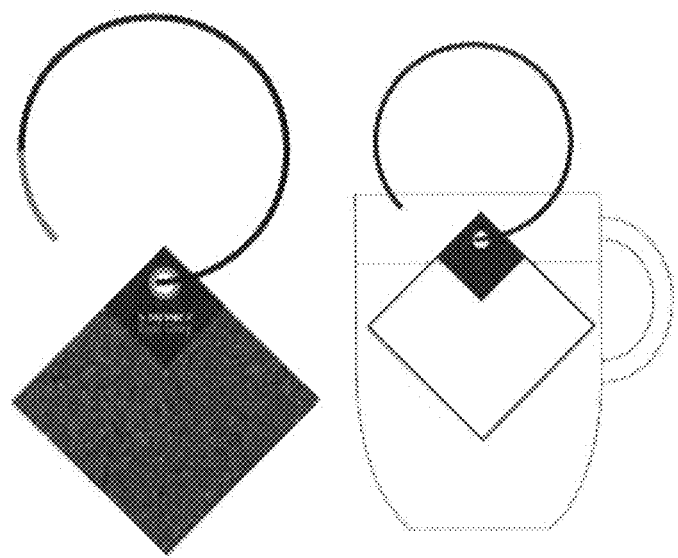
Figure 19G:
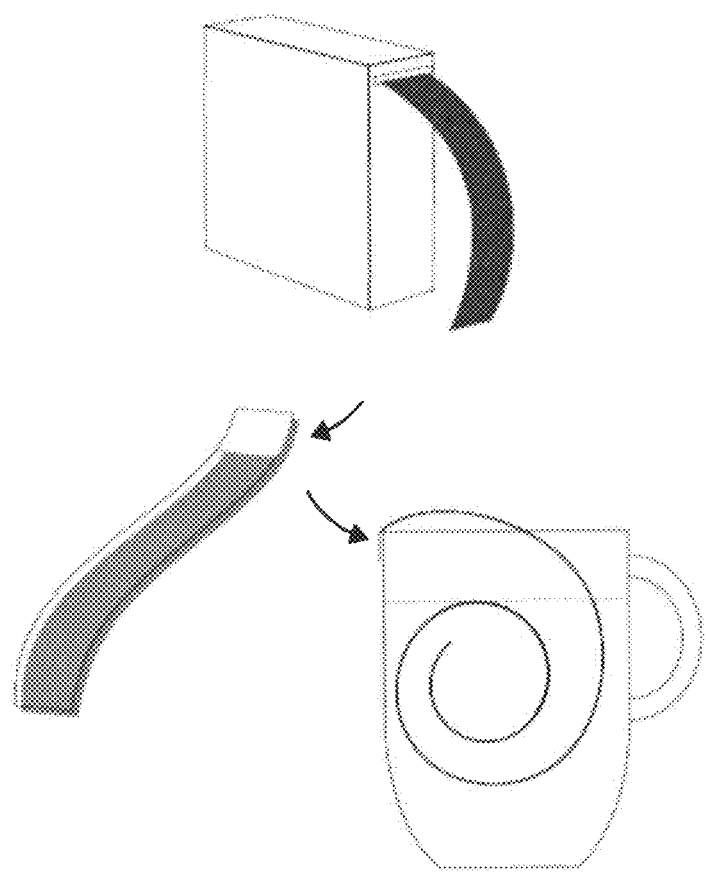
Figure 19H:
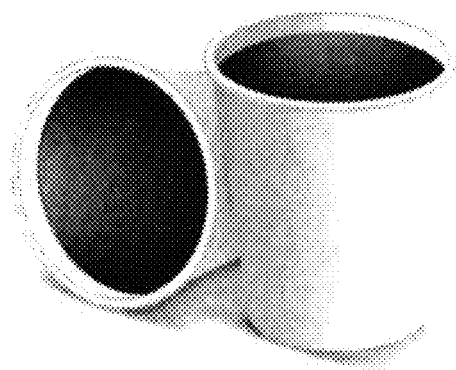
Figure 19I:
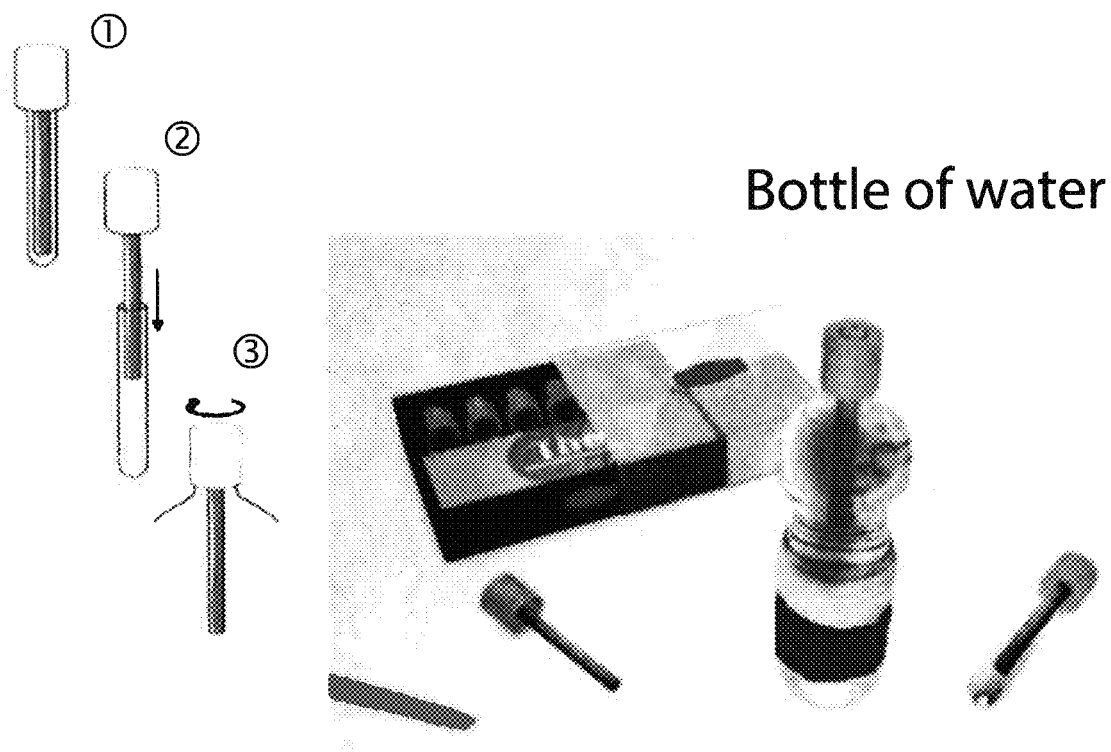
Figure 19J:
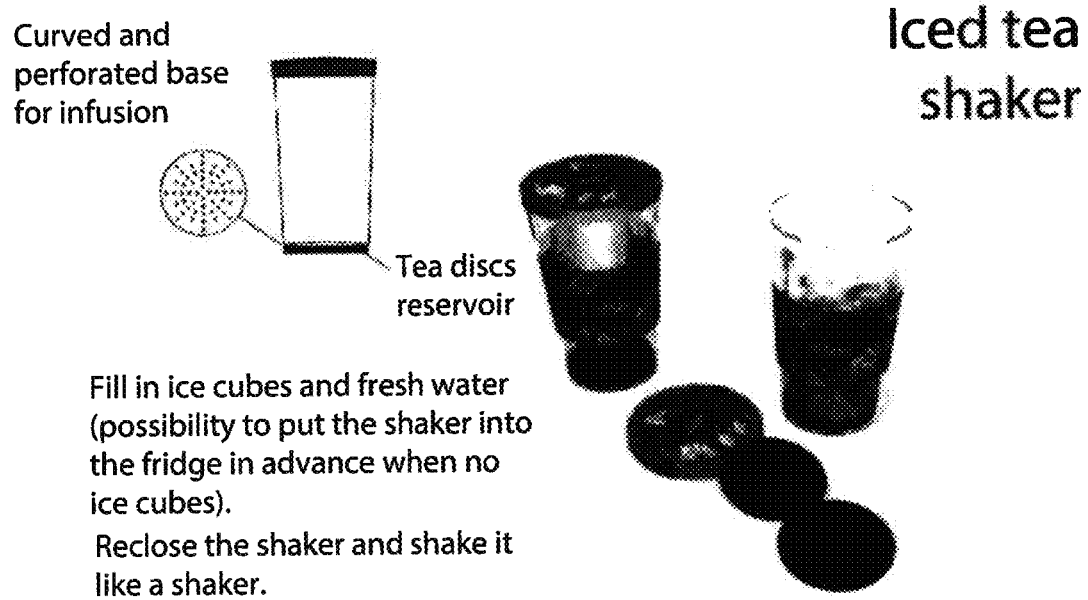
Figure 19K:
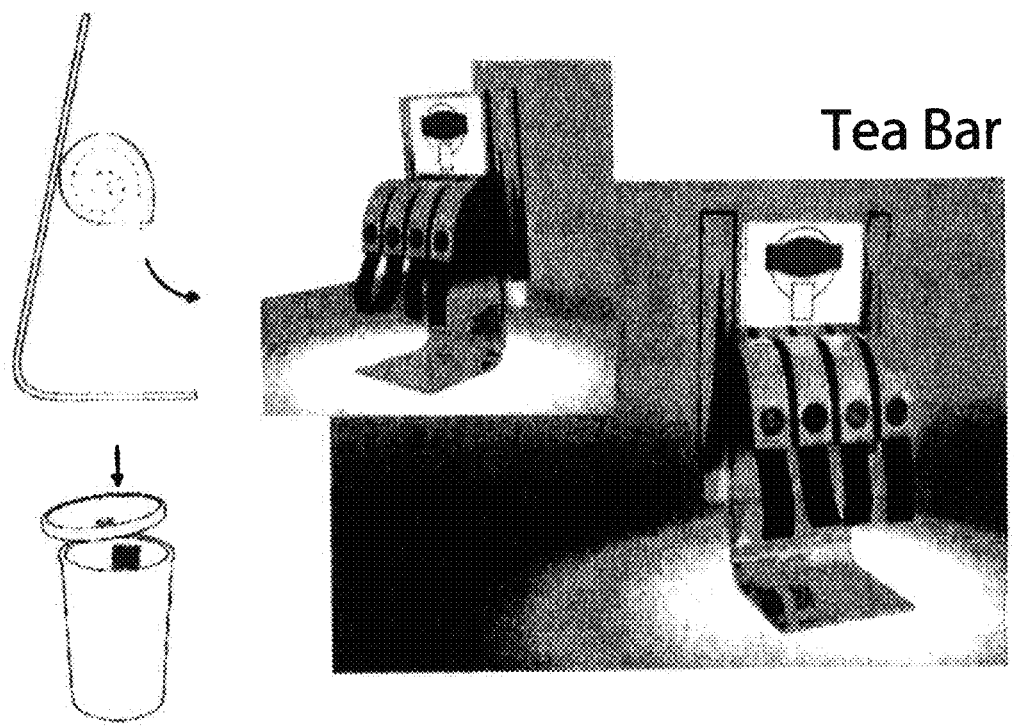
Figure 20:
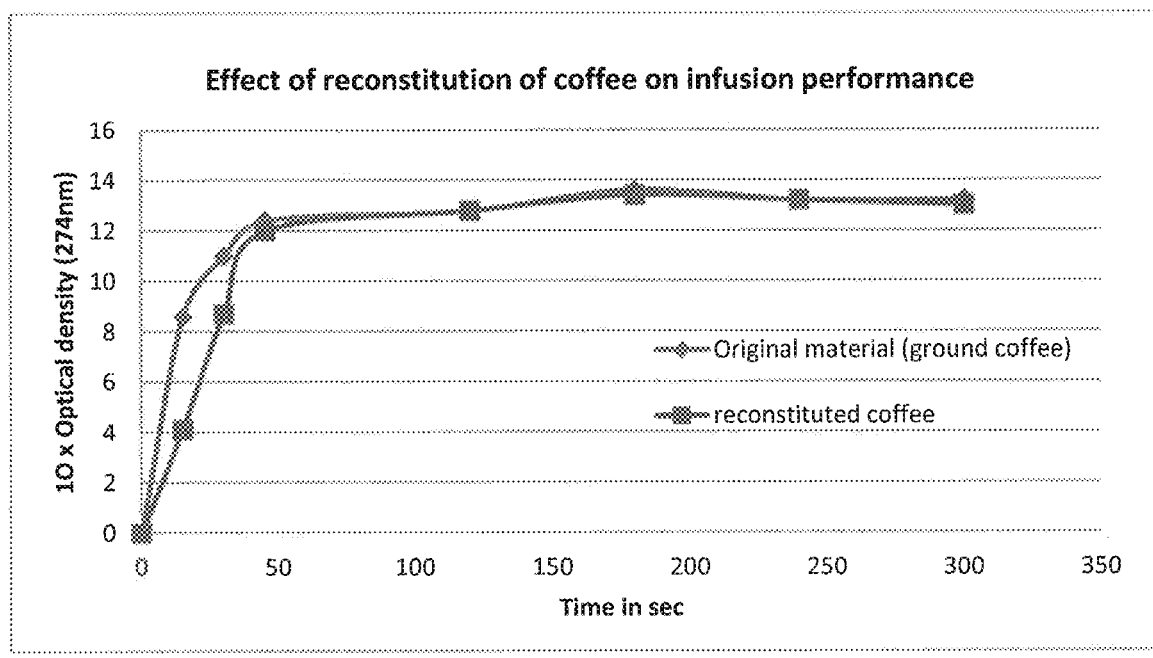
FIG. 20 shows the infusion performance of a reconstituted coffee material.

The product obtained in this example was tested for its sensory properties and compared to natural blend material used for the experiment as described above. Both products were used to make the infusion. For all samples, the total infusion time in hot water (90° C.) was 5 minutes. Same weights of material (2 grs) and identical experimental conditions were used: a beaker containing 200 ml water was heated at 90° C. and blend was immersed into water. Then, after 5 minutes, sensory profile of both products was performed. The result is graphically shown in FIG. 18.

Example 18

Removal of Caffeine from Tea Leaves Thanks to the Reconstitution Process

In order to illustrate the potential of the invention to reduce the amount of specific components from tea, a treatment to decrease caffeine content from tea was developed and tested at the lab scale.

Literature shows that alkaloids compounds such as caffeine are extracted in the soluble portion. Therefore, experiment has been run on the liquor part of tea, after separation step.

A black tea was initially heated at 85° C. for 20 minutes with a tea/water ratio of 1 to 5 by weight. This was followed by an extraction step in a hydraulic press to separate the aqueous portion from the tea fiber portion. The aqueous portion of tea was then mixed with activated charcoal in powder form. Approx. 23 g of activated charcoal was added to 500 ml of tea liquor and mixed at 60° C., stirred at 350 rpm for 1 hour. After filtration, caffeine levels in liquors were measured then through LC-MS method.

The following samples were produced:
Control: standard tea liquor without activated charcoal treatment
A: Tea liquor treated with activated charcoal Acticarbone P13 from CECA
B: Tea liquor treated with activated charcoal Acticarbone 2SW from CECA
C: Tea liquor treated with activated charcoal Acticarbone 3SA from CECA
D: Tea liquor treated with activated charcoal Acticarbone CPL from CECA Caffeine contents in tea liquors are as follows:
Control: 22700 mg/Kg
A: <10 mg/Kg
B: <10 mg/Kg
C: <10 mg/Kg
D: <14 mg/Kg It can be seen that caffeine levels are strongly reduced by using activated charcoal on tea liquor.

Example 19

Reduction of Microbiological Load of Tea Through the Reconstituted Process

Reconstituted tea material produced during experiment 7 was analyzed vs original tea material. Bacteria counts were run (Aerobic Plate Count after 48 hrs at 30° C.). Results are shown in the following table:

|  | Total Aerobic bacteria count (units/grs) |
| --- | --- |
| Original tea material | $8.3 \cdot 10^4$ |
| Reconstituted teas | $1.4 \cdot 10^3$ |

Results show that reconstitution process does reduce the microbiological load. Temperatures applied all along the process have a lethal effect of microorganisms.

Example 20

Reconstituted material was produced in different physical shapes that provide for different kinds of applications. Specifically, the products shown in FIG. 19 are examples that allow for convenient preparation of tea infusions.

Example 21

A reconstituted product was made according to the following method: coffee (*Coffea* spp) was initially heated at 60° C. for 20 minutes with a coffee/water ratio of 1 to 5 by weight. This was followed by an extraction step in a hydraulic press to separate the aqueous portion from the coffee fiber portion. The recovered coffee fiber portion was again heated at 60° C. for 10 minutes with a coffee/water ratio of 1 to 5 by weight. After an additional extraction (by pressing), the fibrous portion was then refined in a Valley beater at 1.4% consistency for 10 minutes. After refining, cellulosic fibers (a blend of abaca, hardwood and softwood pulps, with the respective ratios: 60/10/30) were added to the coffee fibrous residue with a coffee fiber/woodpulp ratio of 5 to 1 in weight and a wet strength agent was then added to the fibrous portion at a level of 5% w/w in order to make hand sheets. The aqueous portion was concentrated in an evaporator to a solid concentration of 50% and then coated on a hand sheet on a manual size-press. In this example, the product was produced at 30% extract content, which is the soluble content of the starting material of the experiment. The coated hand sheets were dried on a plate dryer.

The product obtained in this example was tested for its properties in preparing coffee and compared to original material. Both products were used to make coffee, and the optical density of the solution (coffee) was measured at 274 nm. For all samples, the total infusion time in hot water (90° C.) was 5 minutes. Same weights of coffee material (2.5 grs) and identical experimental conditions were used: a beaker containing 500 ml water was heated at 90° C. At T=0, ie. upon start of the experiment, heating was stopped and a coffee strip was immersed into water. A rotary magnet was used to homogenize the content of the beaker during the entire experiment.

Samples of water were taken regularly and up to 5 minutes. Then, the optical density of the sample was determined using a spectrophotometer at the wavelength of 274 nm (maximum absorption of caffeine). The reference/blank test was run with a sample of clear water heated at 90° C.

The result is graphically shown in FIG. 21 below.

While infusion prepared with original coffee material is faster during the first 50 seconds, after 1 minute, infusion profiles of both samples are similar.

The invention claimed is:

1. A product for making a beverage, the product comprising a fibrous web formed from an insoluble fibrous residue fraction of a plant, wherein the fibrous web is impregnated with a concentrated plant extract, wherein the insoluble fibrous residue fraction and the concentrated plant extract are from the same plant, and wherein the impregnated fibrous web is not disposed within a cellulose-based tea bag;
   wherein the insoluble fibrous residue fraction comprises a tea plant; and
   wherein the product has an optical density at 274 nm of greater than about 0.4 after 2.5 grams of the composition are immersed in 500 ml of water at a temperature of 90° C. for 20 seconds.

2. The product according to claim 1, wherein the insoluble fibrous residue fraction of the plant is mixed the insoluble fibrous residue fraction of at least one further plant prior to preparing the fibrous web wherein the at least one further plant is selected from the group consisting of fruits, medicinal plants, tea, herbal tea, or combinations thereof.

3. The product according to claim 1, wherein the insoluble fibrous residue fraction comprises a blend of different plants, wherein at least one plant comprising the insoluble fibrous residue fraction is from the same plant as the plant extract.

4. The product according to claim 1, wherein the plant extract comprises a blend of different plants, wherein at least one plant comprising the plant extract is from the same plant as the insoluble fibrous residue fraction.

5. The product according to claim 1, wherein the insoluble fibrous residue fraction comprises at least 70% of a fibrous residue from one plant.

6. The product according to claim 1, wherein the plant extract comprises at least 70% of a plant extract from one plant.

7. The product according to claim 1, wherein at least 70% of insoluble fibrous residue fraction and at least 70% of a plant extract is from tea.

8. The product according to claim 1, wherein the plant extract comprises a tea plant.

9. The product according to claim 1, wherein the product has an optical density at 274 nm of greater than about 0.5.

10. The product according to claim 1, wherein the composition has an optical density at 274 nm of at least about 0.6.

11. A method for producing a product for making a beverage, the product comprising a fibrous web formed from an insoluble fibrous residue fraction of a plant wherein the fibrous web is impregnated with a concentrated plant extract the method comprising the steps of:
   a) extracting components of a plant with a solvent;
   b) separating the soluble plant extract from the insoluble fibrous residue fraction of the plant;
   c) optionally refining the insoluble fibrous residue fraction;
   d) preparing a fiber web from the insoluble residue fraction;
   e) concentrating the plant extract;
   f) applying the concentrated plant extract of step e) to the fibrous web of step d); and
   g) drying the fibrous web of step f) to obtain the product for making a beverage,
   wherein the insoluble fibrous residue fraction and the plant extract are from the same plant;
   wherein the impregnated fibrous web is not disposed within a cellulose-based tea bag;
   wherein the insoluble fibrous residue fraction comprises a tea plant; and
   wherein the product has an optical density at 274 nm of greater than about 0.4 after 2.5 grams of the composition are immersed in 500 ml of water at a temperature of 90° C. for 20 seconds.

12. The method of claim 11, wherein the extracting step is performed using components of a blend of plants.

13. The method of claim 11, wherein the extracting step is performed using components of a single plant.

14. The method of claim 11, wherein the insoluble fibrous residue fraction of the plant is mixed with the insoluble fibrous residue fraction of at least one further plant prior to preparing the fibrous web.

15. The method of claim 11, wherein the plant extract of step b) or concentrated plant extract of step e) is mixed with the plant extract or concentrated plant extract of at least one further plant prior to applying the concentrated plant extract to the fibrous web.

16. The method of claim 11, further comprising the step of adding or removing ingredients from the plant extract, the insoluble fibrous residue fraction, or from both the plant extract and the insoluble fibrous residue fraction prior to applying the concentrated plant extract of step e) to the fibrous web of step d).

17. The method of claim 11, wherein the product of step g) is further cut or broken into small regularly or irregularly shaped forms or formed into shapes, dimensions and formats, such as leafs, sticks, bands, cups, mugs, bowls, flasks, kettles, bottles, straws or tubes, discs or sheets.

18. The method of claim 11, wherein the plant is selected from the group consisting of fruits, medicinal plants, tea, herbal tea, or mixtures thereof.

19. A tea capsule comprising the composition of claim 1.

* * * * *